US012640104B2

(12) United States Patent
Moriya et al.

(10) Patent No.: US 12,640,104 B2
(45) Date of Patent: May 26, 2026

(54) CONTROL DEVICE, DISPLAY DEVICE, AND CONTROL METHOD

(71) Applicant: SHARP KABUSHIKI KAISHA, Sakai City (JP)

(72) Inventors: Masaaki Moriya, Sakai City (JP); Hiroyuki Furukawa, Sakai City (JP); Masafumi Kawai, Sakai City (JP); Masafumi Ueno, Sakai City (JP); Naoki Shiobara, Sakai City (JP); Mohammad Reza Kazemi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 7 days.

(21) Appl. No.: 18/838,317

(22) PCT Filed: Apr. 20, 2022

(86) PCT No.: PCT/JP2022/018235

§ 371 (c)(1),
(2) Date: Aug. 14, 2024

(87) PCT Pub. No.: WO2023/203660

PCT Pub. Date: Oct. 26, 2023

(65) Prior Publication Data

US 2025/0166577 A1 May 22, 2025

(51) Int. Cl.
*G09G 3/3291* (2016.01)

(52) U.S. Cl.
CPC ..... *G09G 3/3291* (2013.01); *G09G 2310/027* (2013.01); *G09G 2320/029* (2013.01); *G09G 2320/041* (2013.01)

(58) Field of Classification Search
CPC .... G09G 3/3233; G09G 3/3291; G09G 3/006; G09G 3/3208; G09G 3/20; G09G 3/3225;
(Continued)

(56) References Cited

U.S. PATENT DOCUMENTS

2006/0158402 A1 7/2006 Nathan et al.
2006/0273997 A1 12/2006 Nathan et al.
(Continued)

FOREIGN PATENT DOCUMENTS

JP 2008-523448 A 7/2008
WO WO-2015190258 A1 * 12/2015 ............... G09G 3/30

*Primary Examiner* — Dong Hui Liang
(74) *Attorney, Agent, or Firm* — ScienBiziP, P.C.

(57) ABSTRACT

A control device includes: a monitoring control section configured to obtain, from within a sweep range, a measured value related to a characteristic of a pixel circuit including: a light-emitting element; and a drive transistor configured to control an electric current flowing in the light-emitting element; a correction parameter determining section configured to determine a correction parameter based on the measured value; and a signal correction processing section configured to calculate a drive voltage value for the pixel circuit by correcting a gray level value based on the correction parameter, wherein the monitoring control section determines the sweep range based on a reference measured value that is a previously obtained measured value.

16 Claims, 20 Drawing Sheets

(58) Field of Classification Search

CPC .................... G09G 3/3266; G09G 3/32; G09G 2320/0233; G09G 2320/0295; G09G 2320/045; G09G 2320/043; G09G 2320/0285; G09G 2320/0693; G09G 2320/029; G09G 2300/0842; G09G 2300/0819; G09G 2310/08; G09G 2310/027; G09G 2360/16

See application file for complete search history.

(56) References Cited

U.S. PATENT DOCUMENTS

| | | | |
|---|---|---|---|
| 2010/0033469 | A1 | 2/2010 | Nathan et al. |
| 2011/0199395 | A1 | 8/2011 | Nathan et al. |
| 2012/0293478 | A1 | 11/2012 | Chaji et al. |
| 2013/0027381 | A1 | 1/2013 | Nathan et al. |
| 2013/0201173 | A1 | 8/2013 | Chaji et al. |
| 2013/0286055 | A1 | 10/2013 | Nathan et al. |
| 2013/0307834 | A1 | 11/2013 | Chaji et al. |
| 2014/0062993 | A1 | 3/2014 | Chaji et al. |
| 2014/0084932 | A1 | 3/2014 | Chaji et al. |
| 2014/0111567 | A1 | 4/2014 | Nathan et al. |
| 2014/0159996 | A1 | 6/2014 | Nathan et al. |
| 2014/0168203 | A1 | 6/2014 | Nathan et al. |
| 2014/0225883 | A1 | 8/2014 | Chaji et al. |
| 2014/0285407 | A1 | 9/2014 | Chaji et al. |
| 2014/0340432 | A1 | 11/2014 | Chaji |
| 2015/0002378 | A1 | 1/2015 | Nathan et al. |
| 2015/0192621 | A1 | 7/2015 | Nathan et al. |
| 2015/0213744 | A1 | 7/2015 | Chaji et al. |
| 2015/0339977 | A1 | 11/2015 | Nathan et al. |
| 2016/0104411 | A1 | 4/2016 | Nathan et al. |
| 2016/0253937 | A1 | 9/2016 | Chaji et al. |
| 2017/0061881 | A1 | 3/2017 | Chaji |
| 2017/0140687 | A1 | 5/2017 | Chaji et al. |
| 2018/0005558 | A1 | 1/2018 | Chaji et al. |
| 2018/0005559 | A1 | 1/2018 | Chaji et al. |
| 2018/0301072 | A1 | 10/2018 | Chaji et al. |
| 2018/0301077 | A1 | 10/2018 | Nathan et al. |
| 2019/0066557 | A1 | 2/2019 | Chaji et al. |
| 2019/0325798 | A1 | 10/2019 | Chaji et al. |
| 2020/0027397 | A1 | 1/2020 | Chaji |
| 2020/0234620 | A1 * | 7/2020 | Jang ........................ G09G 3/006 |
| 2020/0327845 | A1 | 10/2020 | Nathan et al. |
| 2022/0051623 | A1 | 2/2022 | Chaji |
| 2022/0223094 | A1 | 7/2022 | Nathan et al. |

* cited by examiner

CONTROL DEVICE, DISPLAY DEVICE, AND CONTROL METHOD

TECHNICAL FIELD

The present disclosure relates to control devices, display devices, and control methods.

BACKGROUND ART

Published Japanese Translation of PCT Application No. 2008-523448 discloses an external compensation technique for correcting data on the basis of, for example, characteristics of drive transistors and characteristics of organic EL elements in an organic EL display device.

SUMMARY

Technical Problem

An exemplary method of measuring a characteristic of, for example, a drive transistor measures a current flow in the drive transistor while changing the voltage across the drive transistor to detect the voltage when a prescribed current is flowing. Such a method enables measurement on, for example, a plurality of drive transistors under the same conditions, thereby enabling obtaining uniform measurement data. However, this measuring method is time consuming. The present disclosure, in an aspect thereof, has an object to reduce measurement time for, for example, drive transistors in external compensation in a display device.

Solution to Problem

The present disclosure, in an aspect thereof, is directed to a control device including: a monitoring control section configured to obtain, from within a sweep range, a measured value related to a characteristic of a pixel circuit including: a light-emitting element; and a drive transistor configured to control an electric current flowing in the light-emitting element; a correction parameter determining section configured to determine a correction parameter based on the measured value; and a signal correction processing section configured to calculate a drive voltage value for the pixel circuit by correcting a gray level value based on the correction parameter, wherein the monitoring control section determines the sweep range based on a reference measured value that is a previously obtained measured value.

The present disclosure, in an aspect thereof, is directed to a display device including: a plurality of pixel circuits; and a control device including: a monitoring control section configured to obtain, from within a sweep range, a measured value related to a characteristic of a pixel circuit including: a light-emitting element; and a drive transistor configured to control an electric current flowing in the light-emitting element; a correction parameter determining section configured to determine a correction parameter based on the measured value; and a signal correction processing section configured to calculate a drive voltage value for the pixel circuit by correcting a gray level value based on the correction parameter, wherein the monitoring control section determines the sweep range based on a reference measured value that is a previously obtained measured value, and the control device controls the plurality of pixel circuits with each of the plurality of pixel circuits being the pixel circuit.

The present disclosure, in an aspect thereof, is directed to a control method including: a monitoring control step of obtaining, from within a sweep range, a measured value related to a characteristic of a pixel circuit including: a light-emitting element; and a drive transistor configured to control an electric current flowing in the light-emitting element; a correction parameter determining step of determining a correction parameter based on the measured value; and a signal correction step of calculating a drive voltage value for the pixel circuit by correcting a gray level value based on the correction parameter, wherein the monitoring control step includes a step of determining the sweep range based on a reference measured value that is a previously obtained measured value.

DESCRIPTION OF EMBODIMENTS

Embodiment 1

Figure 1:
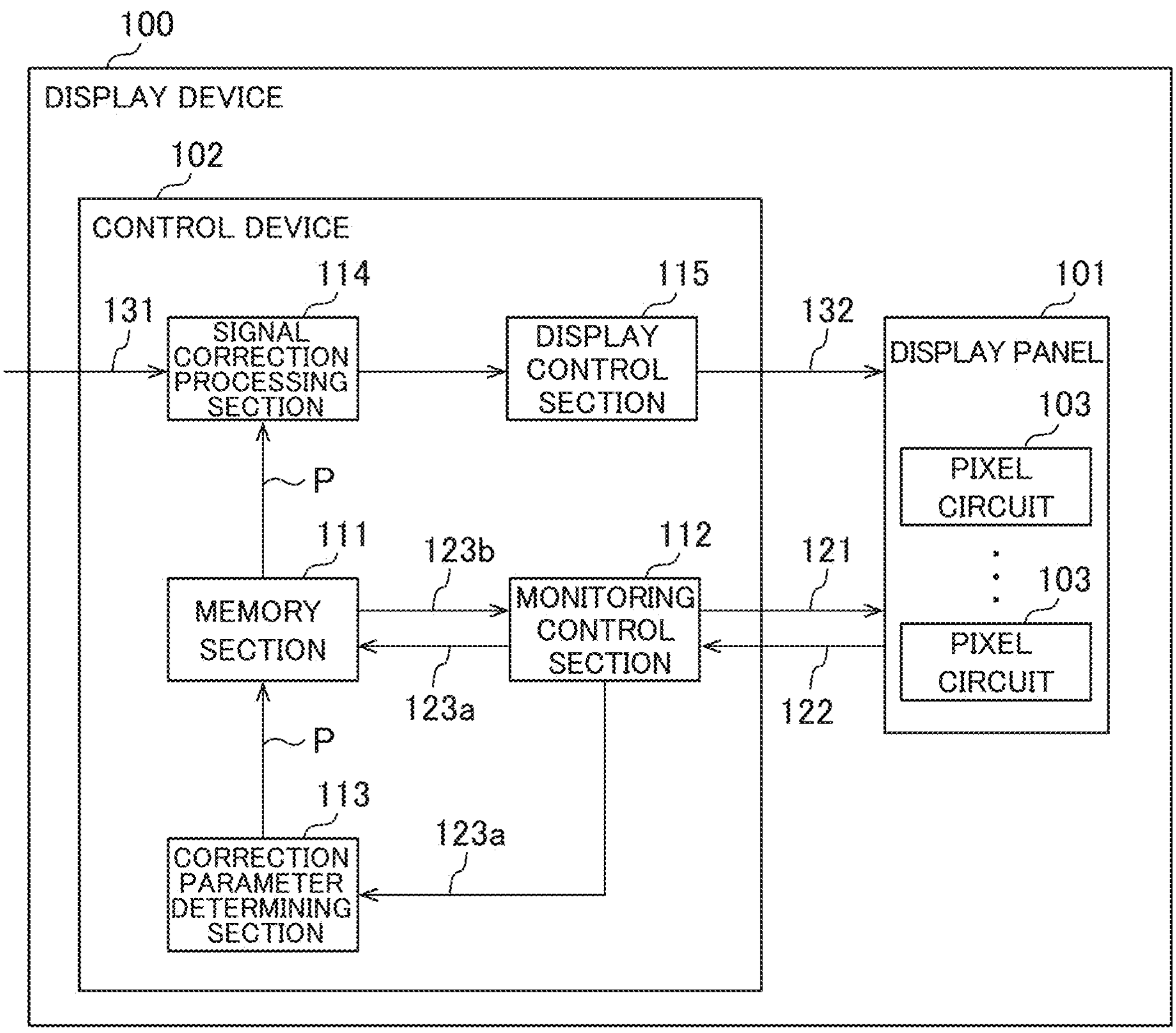
FIG. 1 is a block diagram of an example of a structure of a display device.

A description is given now of Embodiment 1 with reference to FIGS. 1 to 8. Note that identical and equivalent elements are denoted by the same reference numerals, and description thereof is not repeated.

FIG. 1 is a block diagram of an example of a structure of a display device 100. The display device 100 is, for example, an organic EL display device. The display device 100 includes, for example, a display panel 101 and a control device 102. The display device 100 corrects an input image in accordance with the characteristics of the display panel 101 to display a corrected image. The display device 100 is, for example, an organic EL display device. In the present disclosure, an "image" refers to two-dimensional data including R (red), G (green), and B (blue) pixel data. In addition, in the present disclosure, an image does not only include a single set of two-dimensional data, but may also include a plurality of sets of two-dimensional data that are temporally continuous (which may generally be referred to as video).

The display panel 101 includes a plurality of pixel circuits 103. Each pixel circuit 103 includes a light-emitting element L1, a write control transistor T1, a drive transistor T2, a measurement transistor T3, and a capacitor C1 (see FIG. 2).

The light-emitting element L1 is, for example, an OLED (organic light-emitting diode). The light-emitting element L1 may be another type of element that emits light by means of electric current.

The write control transistor T1, the drive transistor T2, and the measurement transistor T3 are, for example, thin film transistors (TFTs). Note that the transistor may be of a type that includes a channel layer composed of amorphous silicon, a type that includes a channel layer composed of low-temperature polysilicon, or a type that includes a channel layer composed of an oxide semiconductor. The oxide semiconductor may be, for example, an indium gallium zinc oxide (IGZO). In addition, the transistor may be a top gate type or a bottom gate type. In addition, the transistor may be a n-channel type or a p-channel type.

The control device 102 controls the plurality of pixel circuits 103. The control device 102 includes, for example, a memory section 111, a monitoring control section 112, a correction parameter determining section 113, a signal correction processing section 114, and a display control section 115.

The memory section 111 is a recording medium for storing data in a non-volatile manner. The memory section 111 is, for example, a flash ROM (read-only memory).

The monitoring control section 112 obtains a measured value 123*a* related to a characteristic of the pixel circuit 103 from a sweep range. The measured value 123*a* represents a characteristic of at least one element selected from the group consisting of the light-emitting element L1 and the drive transistor T2.

The monitoring control section 112 determines a sweep range on the basis of a reference measured value 123*b* that is a previously obtained measured value for each pixel circuit 103. A monitoring input value 121 is swept upwards starting from the lower limit value of the sweep range. Note that in the present specification, the lower limit value of the sweep range may be referred to as the starting value of the sweep range. In addition, in the present specification, the upper limit value of the sweep range may be referred to as the ending value of the sweep range. The monitoring control section 112 supplies the monitoring input value 121 in the sweep range to a pixel circuit, and when a measured monitoring value 122 satisfies target conditions, obtains the monitoring input value 121 as the measured value 123*a*. In contrast, the monitoring control section 112, when the measured value 123*a* cannot be obtained from the sweep range, obtains the reference measured value 123*b* as the measured value 123*a*.

The correction parameter determining section 113 determines a correction parameter P on the basis of the measured value 123*a* for each pixel circuit 103. A conversion model F is defined by the correction parameter P. The conversion model F represents a conversion formula for geometrically converting from reference current-voltage characteristics before a temporal change to current-voltage characteristics after a temporal change. A state before a temporal change is, for example, the state of the display device 100 immediately after the manufacture thereof.

Since a characteristic of the pixel circuit 103 changes with a temporal change, the correction parameter determining section 113 determines the correction parameter P so that the light-emitting element L1 can exhibit the same luminance for the same gray level value before and after a temporal change in an element in the pixel circuit 103. The gray level value represents the luminance of the light-emitting element L1 in each pixel circuit 103 and is represented by an input image.

The signal correction processing section 114 corrects a gray level value 131 represented by the input image on the basis of the correction parameter P for each pixel circuit 103 and calculates a drive voltage value 132 for the pixel circuit 103.

The display control section 115 drives the plurality of pixel circuits 103 by causing to apply a voltage of the drive voltage value 132 for each pixel circuit 103 to the pixel circuit 103.

Figure 2:
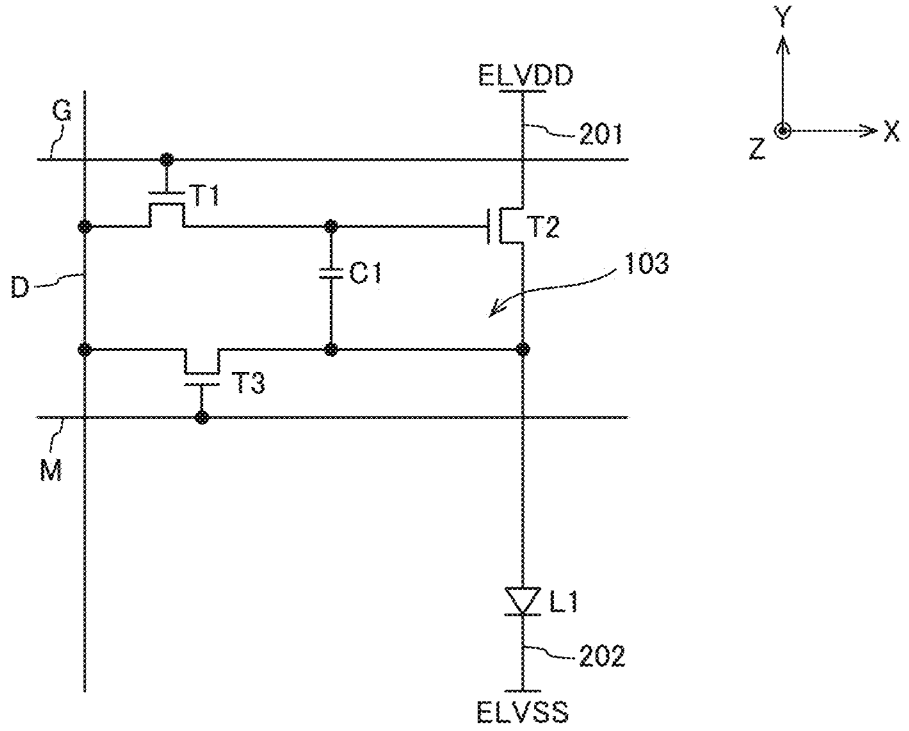
FIG. 2 is a diagram of an example of a pixel circuit.

A description is given next of an example of the pixel circuit 103 with reference to FIG. 2. FIG. 2 is a diagram of an example of the pixel circuit 103. The pixel circuit 103 includes the write control transistor T1, the drive transistor T2, the measurement transistor T3, the light-emitting element L1, and the capacitor C1.

The pixel circuit 103 is connected to a first power supply line 201 and a second power supply line 202. The first power supply line 201 and the second power supply line 202 are connected to a power supply circuit (not shown). The first power supply line 201 is fed with a high-level power supply voltage ELVDD. The second power supply line 202 is fed with a low-level power supply voltage ELVSS. In addition, the power supply circuit is connected to a scan line G, a measurement control line M, and a data line D. In a normal image display, the data line D is a line for applying a voltage to the gate of the drive transistor T2.

The gate of the write control transistor T1 is connected to the scan line G. The drain of the write control transistor T1 is connected to the data line D. The source of the write control transistor T1 is connected to one of terminals of the capacitor C1 and to the gate of the drive transistor T2. The write control transistor T1, when turned on, connects the data line D to the gate of the drive transistor T2. The scan line G is connected to the gate of the write control transistor T1 to control the turning on and off of the write control transistor T1.

The drive transistor T2 controls the current flow in the light-emitting element L1. The drain of the drive transistor T2 is connected to the first power supply line 201. The source of the drive transistor T2 is connected to the other terminal of the capacitor C1, to the measurement transistor T3, and to the anode of the light-emitting element L1.

The measurement transistor T3 is switched between ON and OFF on the basis of the level on the measurement control line M. When the measurement transistor T3 is ON, a current flows through the drive transistor T2 that is an element for which the measured value 123*a* is measured or through the light-emitting element L1. The gate of the measurement transistor T3 is connected to the measurement control line M. In addition, one of the terminals of the measurement transistor T3 other than the gate thereof is connected to the data line D. In addition, the remaining terminal of the measurement transistor T3 other than the gate is connected to the capacitor C1, to the drive transistor T2, and to the anode of the light-emitting element L1.

A description is given next of an operation in producing an image display with reference to FIG. 2.

The display control section 115, when producing an image display, changes the scan line G to an ON level. Furthermore, the display control section 115, when producing an image display, maintains the measurement control line M at the OFF level. Hence, the measurement transistor T3 is kept OFF.

When the scan line G is at the ON level, the write control transistor T1 in the pixel circuit 103 connected to this scan line G is ON. Hence, the gate potential of the drive transistor T2 approaches the drive voltage value 132 applied to the data line D. As a result, the drive transistor T2 is turned ON. Hence, a current flows toward the light-emitting element L1 via the drive transistor T2, and the light-emitting element L1 emits light with a luminance that is in accordance with the drive voltage value 132.

As the select period for the scan line G ends, the display control section 115 changes the scan line G to an OFF level. The write control transistor T1 hence goes OFF in the pixel circuit 103. In the pixel circuit 103, even when the write control transistor T1 goes OFF, the capacitor C1 still maintains the gate-to-source voltage of the drive transistor T2. Therefore, the drive transistor T2 continues to feed, to the light-emitting element L1, an electric current that is in accordance with the voltage maintained by the capacitor C1 until the scan line G changes to the ON level again. Hence, the light-emitting element L1 continues to emit light until the scan line G changes to the ON level.

A description is given next of a case where the monitoring control section 112 measures the monitoring value 122 for the drive transistor T2. Throughout the following description, the monitoring value 122 represents the current value of the current flow in the drive transistor T2 to which a voltage with a voltage value that is the monitoring input value 121 is applied.

The monitoring control section 112 causes to apply a voltage with a voltage value that is the monitoring input value 121 to the data line D of the pixel circuit 103 that is a measurement target. Subsequently, the monitoring control section 112 changes the level on the scan line G of the pixel circuit 103 that is a measurement target to the ON level. Hence, the write control transistor T1 in the pixel circuit 103 that is a measurement target is turned on. As a result, the voltage with a voltage value that is the monitoring input value 121 is applied to the capacitor C1. One of the terminals of the capacitor C1 rises, turning on the drive transistor T2. The monitoring control section 112 causes to keep OFF the measurement transistor T3 in the pixel circuit 103 that is a measurement target until this stage. By turning on the drive transistor T2, a current starts to flow in accordance with an electric charge collected by the capacitor C1. As the application of the voltage with a voltage value that is the monitoring input value 121 to the data line D of the pixel circuit 103 is stopped, the monitoring control section 112 causes the measurement transistor T3 in the pixel circuit 103 that is a measurement target to conduct. As a result, a current flows toward the monitoring control section 112 via the first power supply line 201, the drive transistor T2, the measurement transistor T3, and the data line D. In this case, the monitoring control section 112 measures the current value of the current that has flowed toward the monitoring control section 112 as the monitoring value 122.

A description is given next of a case where the monitoring control section 112 measures the monitoring value 122 for the light-emitting element L1.

The monitoring control section 112 causes to apply a voltage with a voltage value that is the monitoring input value 121 to the data line D of the pixel circuit 103 that is a measurement target. Meanwhile, the monitoring control section 112 causes to maintain the scan line G of the pixel circuit 103 that is a measurement target at the OFF level. Hence, the write control transistor T1 and the drive transistor T2 are kept OFF. In addition, the monitoring control section 112 causes the measurement transistor T3 to conduct. Hence, the monitoring control section 112 feeds an electric current toward the light-emitting element L1 via the data line D and the measurement transistor T3. When this is the case, the monitoring control section 112 measures the current value of the current flowing in the light-emitting element L1.

Figure 3:
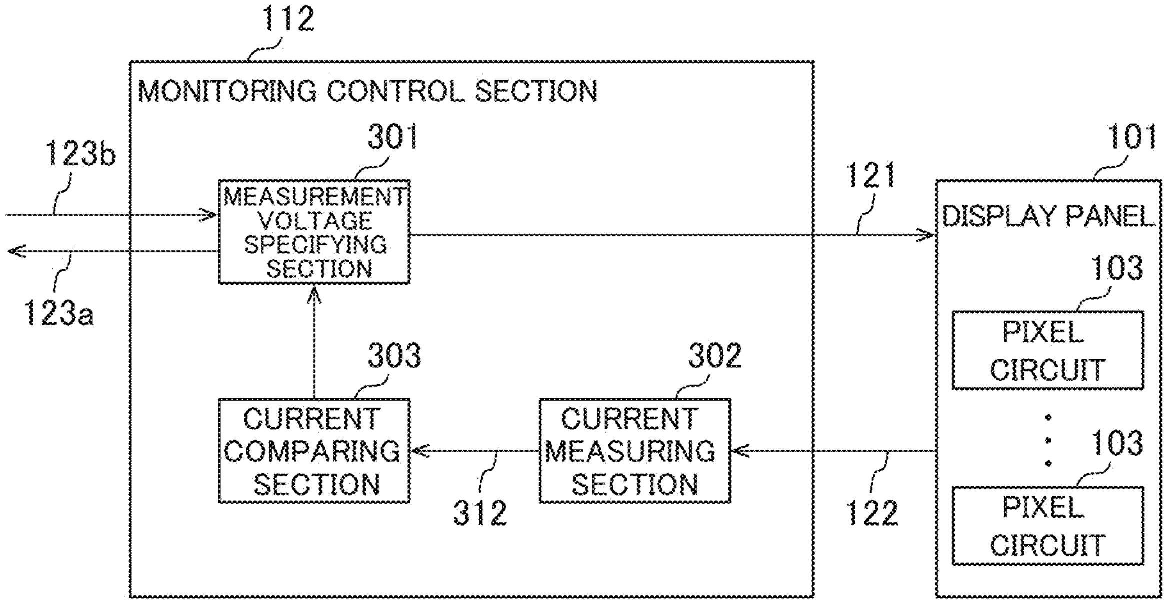
FIG. 3 is a block diagram of an example of a structure of a monitoring control section in accordance with Embodiment 1.

FIG. 3 is a block diagram of an example of a structure of the monitoring control section 112. The monitoring control section 112 includes, for example, a measurement voltage specifying section 301, a current measuring section 302, and a current comparing section 303.

The measurement voltage specifying section 301 applies the voltage with a voltage value that is the monitoring input value 121 to the pixel circuit 103 in every step while increasing the voltage by a prescribed step width Vint from a lower limit value Vmin of the sweep range. The step width Vint is an addition voltage at a time when the voltage value that is the monitoring input value 121 is swept across the sweep range.

The current measuring section 302, when the voltage with a voltage value that is the monitoring input value 121 is applied to the pixel circuit 103, measures the monitoring value 122 that is a measured current value. Specifically, the current measuring section 302, when the voltage that is the monitoring input value 121 is applied to the pixel circuit 103, measures the monitoring value 122 that is the current value of an electric current flow in either one or both of the elements selected from the group consisting of the drive transistor T2 and the light-emitting element L1.

The current comparing section 303 determines whether or not the current value that is the monitoring value 122 satisfies target conditions. For example, the target conditions are that the current value that is the monitoring value 122 exceeds a prescribed target current.

The current comparing section 303, when the current value that is the monitoring value 122 satisfies the target conditions, outputs the current value that is the monitoring value 122 to the measurement voltage specifying section 301. The measurement voltage specifying section 301, when the current value that is the monitoring value 122 satisfies the target conditions, outputs the voltage value applied to the pixel circuit 103 to the correction parameter determining section 113 as the measured value 123*a*.

Figure 4:
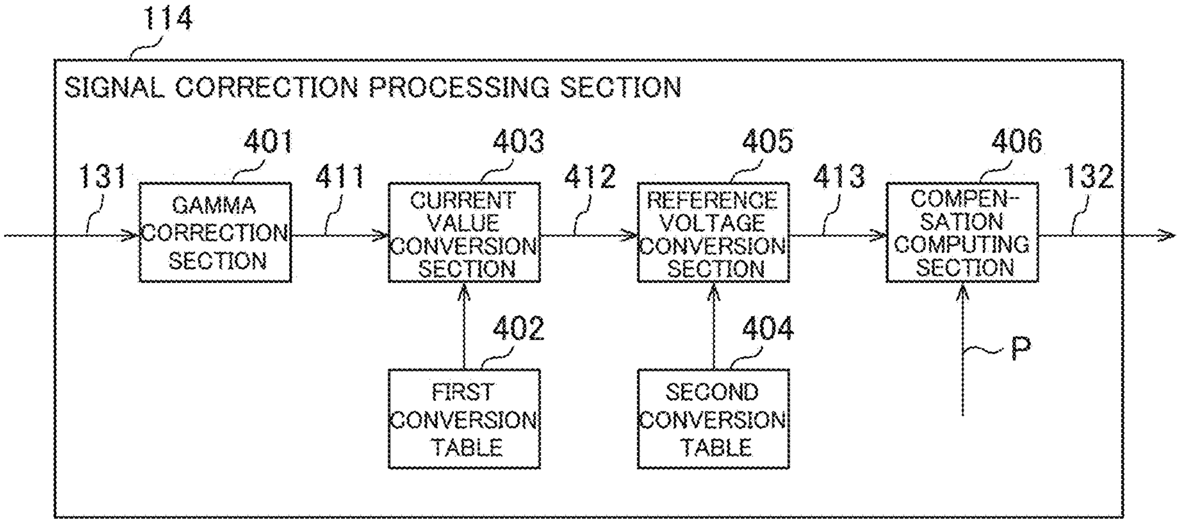
FIG. 4 is a block diagram of an example of a structure of a signal correction processing section in accordance with Embodiment 1.

FIG. 4 is a block diagram of an example of a structure of the signal correction processing section 114. The signal correction processing section 114 includes, for example, a gamma correction section 401, a first conversion table 402, a current value conversion section 403, a second conversion table 404, a reference voltage conversion section 405, and a compensation computing section 406.

The gamma correction section 401 converts the gray level value 131 represented by an input image to a voltage value 411. The first conversion table 402 stores data representing voltage-current characteristics. The current value conversion section 403 converts the voltage value 411 to a current value 412 using the data stored in the first conversion table 402.

The second conversion table 404 stores data that associates voltage values with current values for each type of element related to the characteristic represented by the measured value 123*a*. Specifically, the second conversion table 404 stores data representing reference current-voltage characteristics. The reference current-voltage characteristics represent a representative value of the current-voltage characteristics measured on the plurality of pixel circuits 103 before a temporal change. The second conversion table 404 stores: data that associates voltage values with current values in relation to a characteristic of the drive transistor T2; and data that associates voltage values with current values in relation to a characteristic of the light-emitting element L1.

The reference voltage conversion section 405 converts the current value 412 to a voltage value 413 in accordance with the type of the element related to the characteristic represented by the measured value 123*a* by using the data stored in the second conversion table 404. For example, when the characteristic represented by the measured value 123*a* and the reference measured value 123*b* represents a characteristic in relation to the drive transistor T2, the reference voltage conversion section 405 converts the current value 412 to the voltage value 413 by using the data related to a characteristic in relation to the drive transistor T2 stored in the second conversion table 404. Meanwhile, when the characteristic represented by the measured value 123*a* and the reference measured value 123*b* represents a characteristic related to the light-emitting element L1, the reference voltage conversion section 405 converts the current value 412 to the voltage value 413 by using the data related to a characteristic in relation to the light-emitting element L1 stored in the second conversion table 404.

The compensation computing section 406 corrects the voltage value 413 on the basis of the correction parameter P to calculate the drive voltage value 132. Specifically, the compensation computing section 406 calculates the drive voltage value 132 from the reference current-voltage characteristics by plugging the voltage value 413 into the conversion formula represented by the conversion model F.

Figure 5:
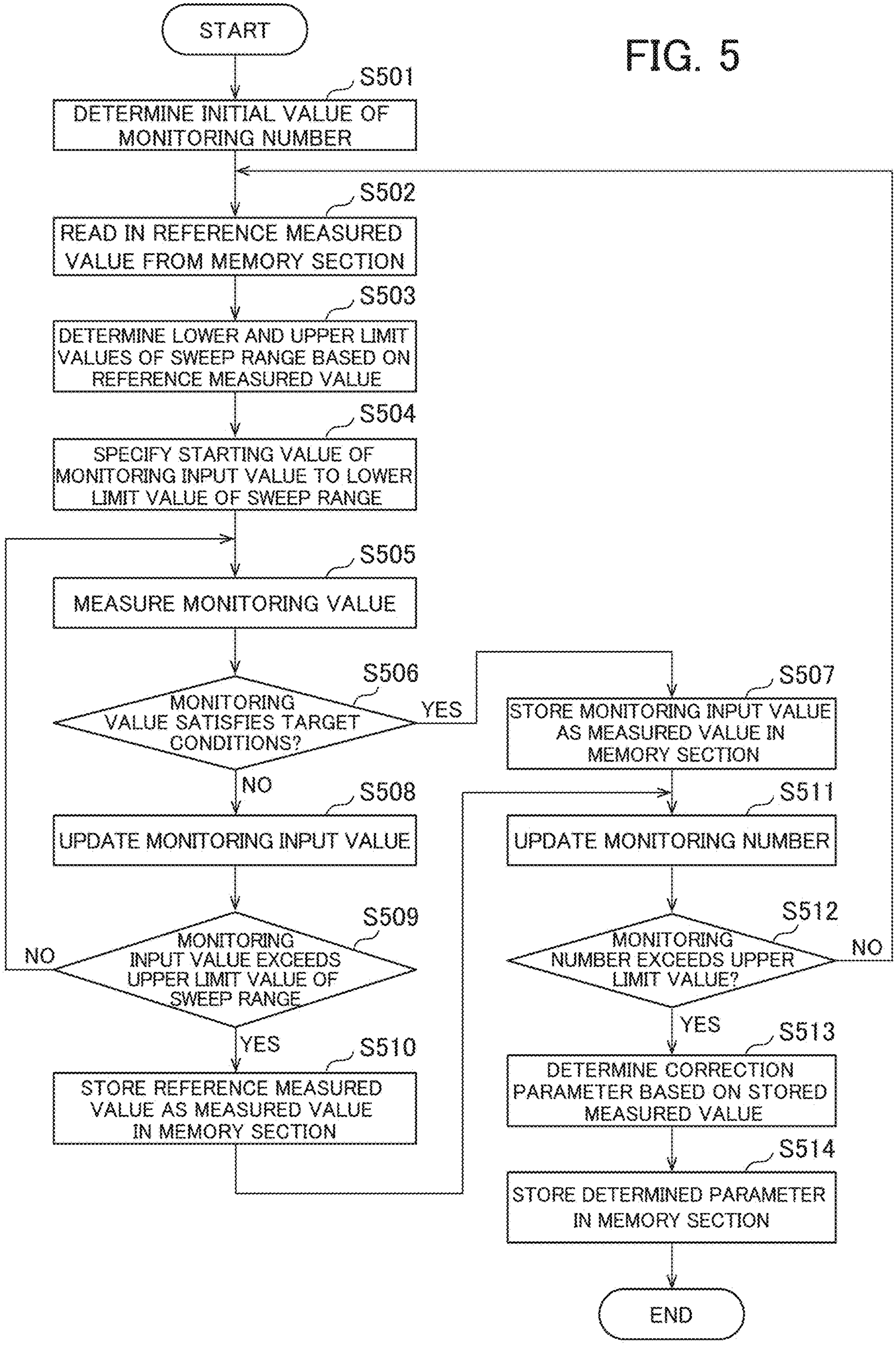
FIG. 5 is a flow chart representing an example of a process of obtaining a measured value in a control device in accordance with Embodiment 1.

FIG. 5 is a flow chart representing an example of a process of obtaining the measured value 123*a* in relation to the pixel circuit 103 in the control device 102 in accordance with the present embodiment.

In the process shown as an example in FIG. 5, the monitoring input value 121 represents the voltage value of a voltage applied to at least one element selected from the group consisting of the drive transistor T2 and the light-emitting element L1. In addition, in the process shown as an example in FIG. 5, the monitoring value 122 represents the current value of an electric current flow in the element to which the voltage with a voltage value represented by the monitoring input value 121 is applied.

In addition, in the process shown as an example in FIG. 5, it is assumed that the number of the correction parameters P for defining the conversion model F is equal to N and that the monitoring control section 112 obtains N voltage values as measured values 123*a*.

In addition, in the process shown as an example in FIG. 5, it is assumed that the target conditions for a monitoring number n are that a current value Im which is the monitoring value 122 exceeds a current threshold value for the monitoring number n. The monitoring number n is a natural number more than or equal to 1 and less than or equal to N. In addition, it is assumed that N current threshold values are determined in advance when the control device 102 starts the process of step S501 shown as an example in FIG. 5. In addition, in the following description, N correction parameters P are referred to as correction parameters Pn when the N correction parameters P are to be distinguished from each other.

Furthermore, it is assumed that the reference current-voltage characteristics are determined when the control device 102 starts the process of step S501 shown as an example in FIG. 5. Furthermore, it is assumed that the correction parameter P is defined as a variable in the conversion formula for geometrically converting from the reference current-voltage characteristics to the current-voltage characteristics represented by the conversion model F when the control device 102 starts the process of step S501 shown as an example in FIG. 5.

In step S501, the monitoring control section 112 determines n=1 which is the initial value of the monitoring number n. In step S502, the monitoring control section 112 reads out a voltage value Vb(n) which is the reference measured value 123*b* for the monitoring number n from the memory section 111.

In step S503, the monitoring control section 112 determines the lower limit value Vmin of the sweep range and the upper limit value Vmax of the sweep range on the basis of the voltage value Vb(n) which is the reference measured value 123*b*. The lower limit value Vmin of the sweep range is lower by a first value Vlower than Vb(n) which is the reference measured value 123*b*. In other words, the monitoring control section 112 determines the lower limit value Vmin of the sweep range from the formula, "Vmin=Vb(n)−Vlower." In addition, the upper limit value Vmax of the sweep range is greater by a second value Vupper than the voltage value Vb(n) which is the reference measured value 123*b*. In other words, the monitoring control section 112 determines the upper limit value Vmax of the sweep range from the formula, "Vmax=Vb(n)+Vupper."

Since the characteristics of elements in the pixel circuit 103 do not change abruptly, the monitoring input value 121 for which the monitoring value 122 that satisfies the target conditions is measured can be close to the monitoring input value 121 for which the monitoring value 122 that satisfies the target conditions was previously measured. Accordingly, the monitoring control section 112 specifies each of the lower limit value Vmin and the upper limit value Vmax of the sweep range to a value close to the reference measured value 123*b*. Hence, the monitoring control section 112 can specify the sweep range to a range in the vicinity of the reference measured value 123*b*.

In step S504, the monitoring control section 112 specifies the sweep starting value for a voltage value Vm which is the monitoring input value 121 to the lower limit value Vmin of the sweep range. Note that m is greater than or equal to 1 and less than or equal to the number of steps in the sweep range. For example, the number of steps is a quotient obtained by dividing the sweep range by the prescribed step width Vint. The step width Vint is an addition voltage at a time when the voltage value Vm which is the monitoring input value 121 is swept across the sweep range.

In step S505, the monitoring control section 112 measures the current value Im which is the monitoring value 122 by applying the voltage value Vm which is the monitoring input value 121 to the pixel circuit 103 that is a measurement target. Specifically, the current measuring section 302 measures the current value Im of the electric current flowing in the drive transistor T2 or the light-emitting element L1 when the voltage value Vm is applied.

In step S506, the monitoring control section 112 determines whether or not the current value Im which is the monitoring value 122 satisfies the target conditions. Specifically, the current comparing section 303 determines whether or not the current value Im which is the monitoring value 122 exceeds a current threshold value for the monitoring number n. If the current value Im which is the monitoring value 122 exceeds the current threshold value for the monitoring number n, the current comparing section 303 determines that the current value Im which is the monitoring value 122 satisfies the target conditions. On the other hand, if the current value Im which is the monitoring value 122 is less than or equal to the current threshold value for the monitoring number n, the current comparing section 303 determines that the current value Im which is the monitoring value 122 does not satisfy the target conditions.

In step S506, if the current value Im which is the monitoring value 122 satisfies the target conditions (Yes), the monitoring control section 112, in step S507, stores the voltage value Vm which is the monitoring input value 121 as the measured value 123*a* in the memory section 111. In other words, when a new measured value 123*a* is obtained by using the measured value 123*a* stored in the memory section 111 as the reference measured value 123*b*, the monitoring control section 112 causes the memory section 111 to store the new measured value 123*a* in place of a measured value 123 stored in the memory section 111. Then, the control device 102 moves the process to step S511.

On the other hand, in step S506, if the current value Im which is the monitoring value 122 does not satisfy the target conditions (No), the monitoring control section 112, in step S508, updates the monitoring input value 121. Specifically, the monitoring control section 112 updates the number of steps m to m=m+1 and determines a voltage value obtained by adding the voltage value of the step width Vint to the voltage value Vm which is the monitoring input value 121 in step S505 as the updated monitoring input value 121 for the updated number of steps m. Then, the control device 102 moves the process to step S509.

In step S509, the monitoring control section 112 determines whether or not the voltage value Vm which is the monitoring input value 121 updated in step S508 exceeds the upper limit value Vmax of the sweep range. If the voltage value Vm which is the monitoring input value 121 does not exceed the upper limit value Vmax of the sweep range in step S509 (No), the control device 102 returns the process to step S505. On the other hand, if the voltage value Vm which is the monitoring input value 121 exceeds the upper limit value Vmax of the sweep range in step S509 (Yes), the monitoring control section 112, in step S510, stores the reference measured value 123*b* as the measured value 123*a* in the memory section 111. A "Yes" in step S509 indicates that the measured value 123*a* has not been obtained in the specified sweep range. In such a case, the reference measured value 123*b* which is a previous measured value is used as the measured value 123*a*. Thereafter, the control device 102 moves the process to step S511.

From the description above, the control device 102 determines a new measured value 123*a* by sweeping across a range in the vicinity of the reference measured value 123*b* which is the measured value 123*a* obtained in a previous measurement. Hence, the control device 102 can reduce the time required in the sweeping for obtaining a new measured value 123*a* over a case where the sweep range is determined on the basis of current-voltage characteristics in a state before a temporal change. In other words, the control device 102 can reduce measurement time for, for example, the drive transistor T2 in external compensation.

In step S511, the monitoring control section 112 updates the monitoring number n to n=n+1. In step S512, it is determined whether or not the monitoring number n updated in step S511 exceeds the number N of the correction parameters P which is the upper limit value of the monitoring number n.

In step S512, if the monitoring number n does not exceed the number N of the correction parameters P (No), the control device 102 returns the process to step S502. In other words, the control device 102 repeats the process of steps S502 to S512 until the control device 102 can obtain N measured values 123*a*. On the other hand, in step S512, if the monitoring number n exceeds the number N of the correction parameters P which is the upper limit value of the monitoring number n (Yes), the control device 102 moves the process to step S513.

In step S513, the correction parameter determining section 113 determines a new correction parameter P on the basis of the measured values 123*a* stored in the memory section 111 in step S507 and step S510. Specifically, N simultaneous equations represented by the conversion model F including N correction parameters P1 to PN are solved so that the N measured values 123*a* stored in the memory section 111 are equal to respective output values of the conversion model F. Hence, the correction parameter determining section 113 can determine the N correction parameters P1 to PN.

In step S514, the correction parameter determining section 113 stores the correction parameter P determined in step S513 in the memory section 111. In other words, when a new correction parameter P is determined, the correction parameter determining section 113 causes the memory section 111 to store the new correction parameter P in place of the correction parameter P stored in the memory section 111. Then, the control device 102 terminates the process of obtaining the characteristics of the pixel circuit 103.

Figure 6A:
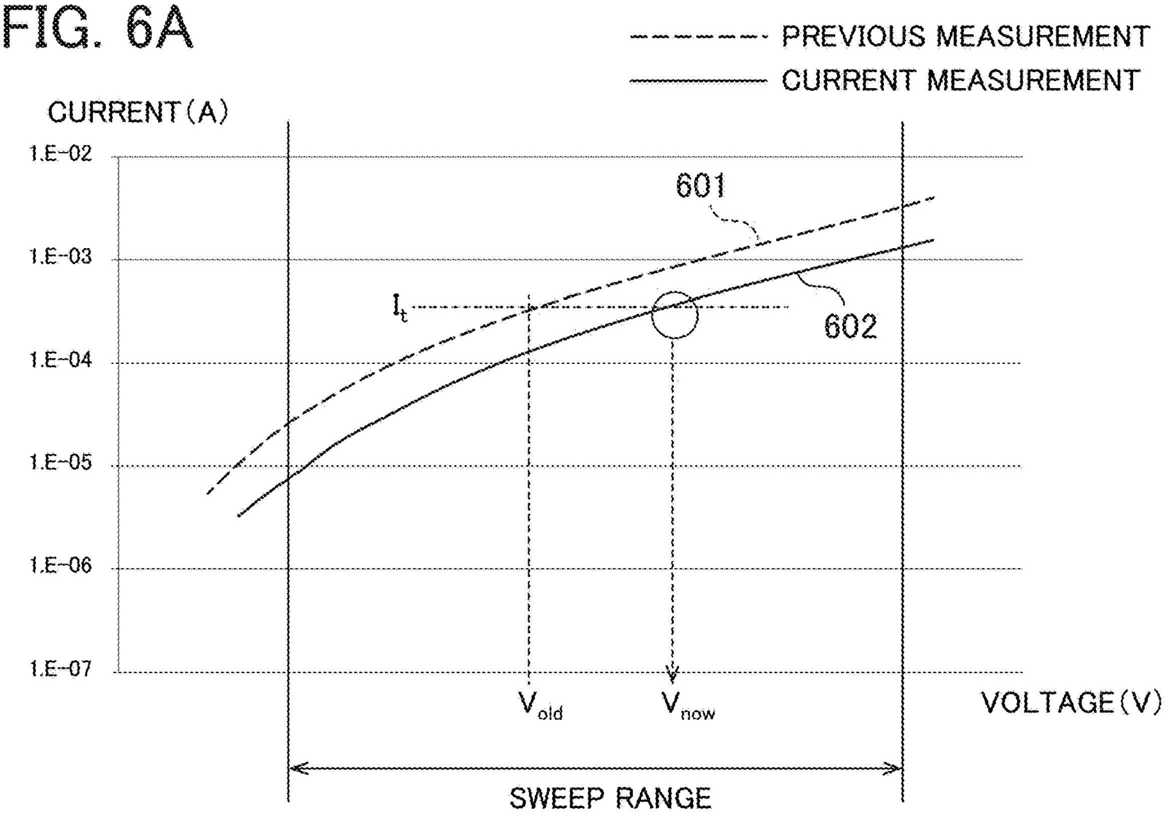
FIG. 6A is a diagram representing a case where a fixed sweep range is always specified as a comparative example of Embodiment 1.
Figure 6B:
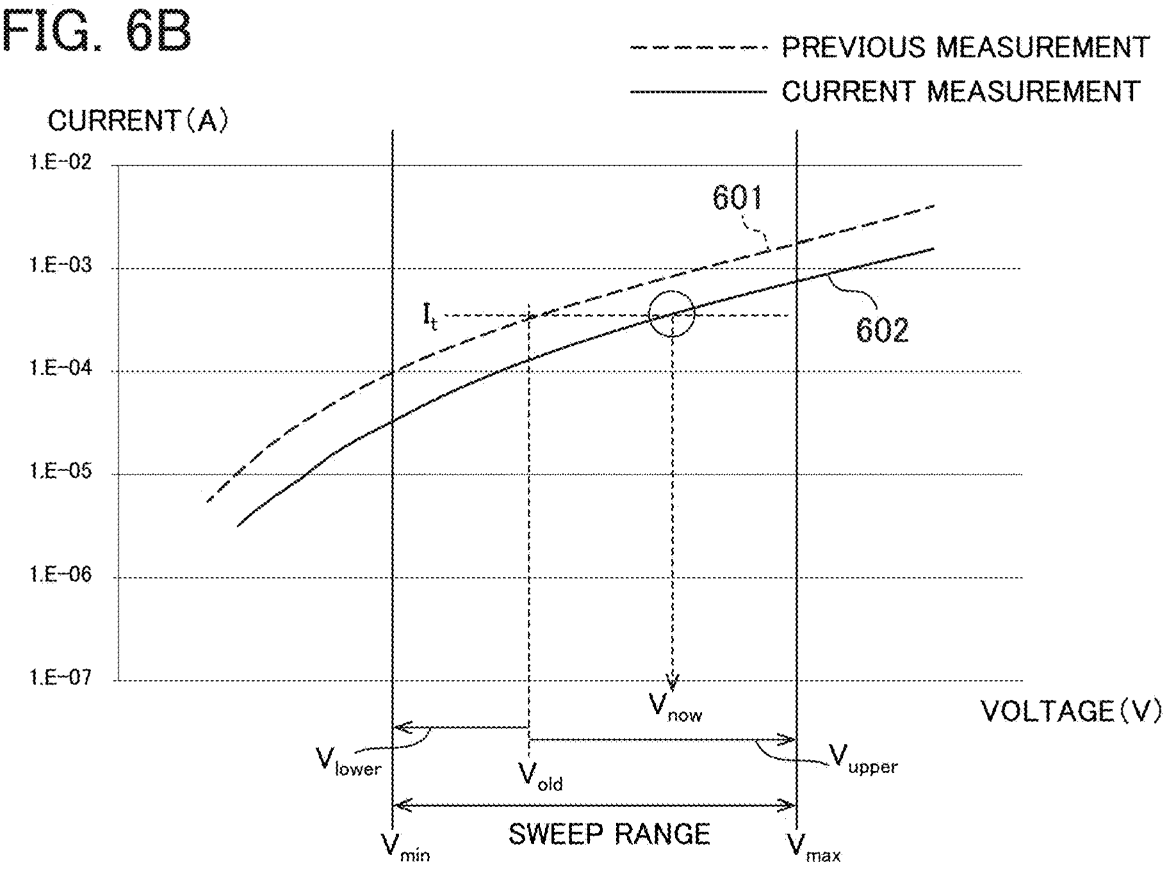
FIG. 6B is a diagram representing an example of a sweep range determined on the basis of a reference measured value that is a measured value obtained in a previous measurement in the control device in accordance with Embodiment 1.

FIG. 6A is a diagram representing a case where a fixed sweep range is always specified as a comparative example of the present embodiment. FIG. 6B is a diagram representing an example of a sweep range determined on the basis of the reference measured value 123*b* which is the measured value 123*a* obtained in a previous measurement in the control device 102 in accordance with the present embodiment. Current-voltage characteristics 601 shown as an example in FIGS. 6A and 6B show current-voltage characteristics of a pixel circuit 103 obtained when the reference measured value 123*b* was previously measured. Current-voltage characteristics 602 shown as an example in FIGS. 6A and 6B show the present current-voltage characteristics of that pixel circuit 103. A voltage value $V_{old}$ shown as an example in FIGS. 6A and 6B is the monitoring input value 121 for which a current value $I_t$ which is the monitoring value 122 that satisfies the target conditions is measured in the pixel circuit 103 the reference measured value 123*b* of which was previously measured. A voltage value $V_{now}$ shown as an example in FIGS. 6A and 6B is the monitoring input value 121 for which the current value $I_t$ which is the monitoring value 122 that satisfies the target conditions is measured in the present pixel circuit 103. According to FIGS. 6A and 6B, the voltage required to cause the flow of the current value $I_t$ is higher in the present current-voltage characteristics 602 due to degradation than in the previous current-voltage characteristics 601.

In the comparative example shown in FIG. 6A, since a fixed sweep range is always specified, a broad sweep range is specified so that the measured value 123*a* can be obtained in the sweep range both when the degradation is severe and when the degradation is mild. In addition, a broad sweep range needs to be specified also to be compatible with variations of the plurality of pixel circuits 103. For the monitoring control section 112 to obtain the measured value 123*a*, the monitoring value 122 needs to be measured by supplying a plurality of monitoring input values 121 to the pixel circuit 103. Therefore, with a broader sweep range, it is necessary to supply more monitoring input values 121 to the pixel circuit 103 and measure more monitoring values 122. Therefore, a broader sweep range requires more time to obtain the measured value 123*a*. Therefore, the sweep range specified in the comparative example requires a long time to obtain the measured value 123*a*.

Meanwhile, the sweep range for the control device 102 in accordance with the present embodiment shown in FIG. 6B is determined on the basis of the voltage value $V_{old}$ which is the previous reference measured value 123*b* for a pixel circuit 103. More specifically, as described above, the lower limit value Vmin of the sweep range is determined from the formula, "$\text{Vmin}=V_{old}-\text{Vlower}$," and the upper limit value Vmax of the sweep range is determined from the formula, "$\text{Vmax}=V_{old}+\text{Vupper}$." In other words, since every time a measurement is made, the sweep range is specified in accordance with the degradation of each pixel circuit 103 at the time of measurement, a narrower sweep range can be specified than in the comparative example shown in FIG. 6A. In addition, since the sweep range is specified individually for the plurality of pixel circuits 103, the influence by the variations of the pixel circuits 103 can be alleviated. Therefore, the control device 102 in accordance with the present embodiment can reduce the time required in the sweeping for obtaining the measured value 123*a*.

Furthermore, for the correction parameter determining section 113 to determine the plurality of correction parameters P, the monitoring control section 112 needs to obtain a plurality of measured values 123*a*. Therefore, with a broader sweep range, the correction parameter determining section 113 requires more time to determine the plurality of correction parameters P. However, the control device 102 in accordance with the present embodiment reduces the time required in the sweeping for obtaining the measured value 123*a*, by determining the sweep range on the basis of the reference measured value 123*b*. Hence, the control device 102 in accordance with the present embodiment can reduce the time required to determine the plurality of correction parameters P.

Note that as shown in FIGS. 6A and 6B, the reference measured value 123*b* of the pixel circuit 103 generally tends to grow larger rom $V_{old}$ to $V_{now}$ because of degradation. From this description, $V_{now}$ could be quickly found by specifying the $\text{Vmin}=V_{old}-\text{Vlower}$ determined on the basis of $V_{old}$ as the starting value of the input value 121 in obtaining $V_{now}$ and by sweeping upwards from there.

Figure 7:
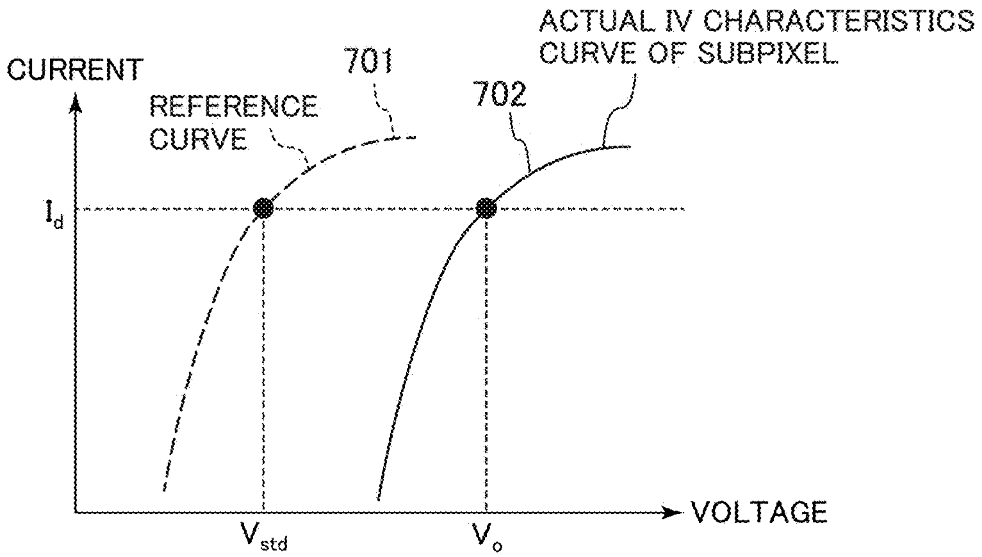
FIG. 7 is a diagram representing an example of reference current-voltage characteristics and an example of the current-voltage characteristics determined from a conversion model.

FIG. 7 is a diagram representing an example of reference current-voltage characteristics 701 stored in the second conversion table 404 and an example of current-voltage characteristics 702 determined using the conversion model F.

The current-voltage characteristics 701 are current-voltage characteristics obtained by measurement before a temporal change. The current-voltage characteristics 702 are current-voltage characteristics obtained by measurement after the temporal change. The current-voltage characteristics 702 are determined by measuring a plurality of current values of the electric current flowing in, and a plurality of voltage values of the voltage applied to, the pixel circuit 103 in which the characteristics of an element have changed because of a temporal change. $V_{std}$ is the voltage value for which a current value $I_d$ is obtained in the reference current-voltage characteristics 701. $V_o$ is the voltage value for which the current value $I_d$ is obtained in the current-voltage characteristics 702. The conversion model F is determined so that the current-voltage characteristics 702 obtained by measurement after a temporal change have a profile produced by a geometrical conversion of the current-voltage characteristics 701 obtained by measurement before the temporal change. For example, for the conversion model F(x, P1, P2, P3), a voltage value $V_o$ is calculated from the calculation formula, "$V_o=F(V_{std}, P1, P2, P3)$."

Figure 8:
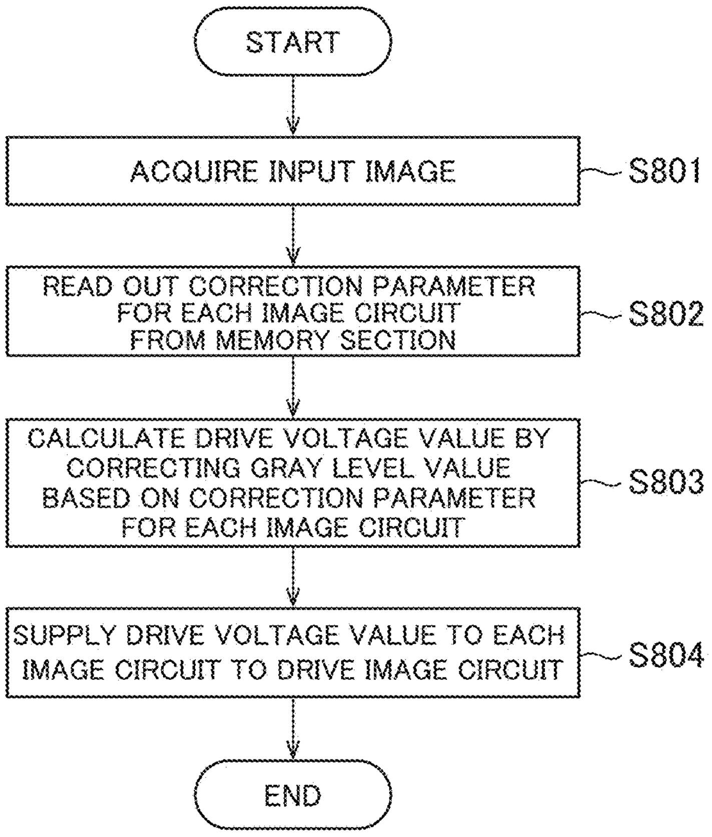
FIG. 8 is a flow chart representing an example of a process of compensation performed on a pixel circuit in the control device in accordance with Embodiment 1.

FIG. 8 is a flow chart representing an example of a process of compensating on the pixel circuit 103 in the control device 102 in accordance with the present embodiment. It is assumed that the measured value 123*a* and the correction parameter P are already stored in the memory section 111 when the control device 102 starts the process of step S801 shown as an example in FIG. 8.

In step S801, the signal correction processing section 114 acquires an input image. The input image represents the gray level value 131 for each pixel. In step S802, the signal correction processing section 114 reads out the correction parameter P for each pixel circuit 103 from the memory section 111.

In step S803, for each pixel circuit 103, the signal correction processing section 114 calculates the drive voltage value 132 by correcting the gray level value 131 represented by the input image acquired in step S801 on the basis of the correction parameter P read out in step S802. Specifically, in the signal correction processing section 114, the gray level value 131 is corrected, and the drive voltage value 132 is calculated, on the basis of the correction parameter P by the gamma correction section 401, the current value conversion section 403, the reference voltage conversion section 405, and the compensation computing section 406 sequentially performing a process.

In step S804, the display control section 115 supplies the drive voltage value 132 calculated in step S803 to each pixel circuit 103 to drive the pixel circuit 103. Even if the characteristics of an element included in the pixel circuit 103 have changed, the control device 102 can cause the light-emitting element L1 to emit light in the same manner as before the characteristics of this element have changed, by calculating the drive voltage value 132 using the correction parameter P.

As described above, the display device 100 in accordance with the present embodiment can restrain decreases in the display quality of the display panel 101 even when the characteristics of an element included in the pixel circuit 103 have changed.

Variation Example 1

As Variation Example 1 of the control device 102 in accordance with the present embodiment, the monitoring control section 112 may sweep related to the current value that is the monitoring input value 121 to measure the monitoring value 122 which is a voltage value measured when this current value is fed to the pixel circuit 103. Then, when the voltage value that is the monitoring value 122 satisfies the target conditions, the monitoring control section 112 may obtain the current value that is the monitoring input value 121 as the measured value 123*a*. In such a case, the monitoring control section 112 may determine the sweep range that is a range of a current value on the basis of the current value that is the previously obtained measured value 123*a*. In other words, the monitoring control section 112 may determine the sweep range that is a range of a current value on the basis of a current value that is the reference measured value 123*b*.

Variation Example 2

As Variation Example 2 of the control device 102 in accordance with the present embodiment, the monitoring control section 112 may sweep the monitoring input value 121 upwards starting from a new lower limit value that is lower than the lower limit value Vmin to obtain the measured value 123*a* when the monitoring input value 121 which is the lower limit value Vmin of the sweep range is fed to the pixel circuit 103, and the monitoring value 122 satisfies the target conditions. In other words, when the monitoring input value 121 which is the sweep starting value is fed to the pixel circuit 103, and the monitoring value 122 satisfies the target conditions, the monitoring control section 112 may sweep the monitoring input value 121 upwards starting from a new lower limit value that is lower than the lower limit value Vmin to obtain the measured value 123*a*.

For instance, the target conditions are that a current threshold value is exceeded. In such a case, by specifying a new value that is lower than the lower limit value Vmin as a sweep starting value when the monitoring input value 121 that is a sweep starting value exceeds the current threshold value, a monitoring value 122 could be measured that is closer to a current threshold value than the monitoring value 122 measured by supplying the first sweep starting value to the pixel circuit 103. Therefore, the control device 102 in accordance with the present variation example can obtain, as the measured value 123*a*, the monitoring input value 121 for which the monitoring value 122 closer to a current threshold value is measured. Hence, the control device 102 in accordance with the present variation example can more accurately obtain, as the measured value 123*a*, the monitoring input value 121 at the time of exceeding the current threshold value when the monitoring input value has been swept upwards starting from the lower limit value.

Variation Example 3

As Variation Example 3 of the control device 102 in accordance with the present embodiment, the monitoring control section 112 may, when the monitoring input value 121 exceeds the upper limit value Vmax of the sweep range in the process of step S509 shown as an example in FIG. 5, may return to step S505 and continue the process after increasing Vmax. This is, in other words, a process of expanding the ending value side of the sweep range. This arrangement can increase the possibility of obtaining the monitoring value 122 that satisfies the target conditions. In addition, furthermore, there may be a limit on the number of times that Vmax is increased. Note that although the monitoring input value sweeps from a small value toward a large value in the present embodiment, when the monitoring input value sweeps conversely from a large value toward a small value, the ending value side of the sweep range can be expanded by replacing the ending value of the sweep range with a smaller value.

Embodiment 2

Figure 9:
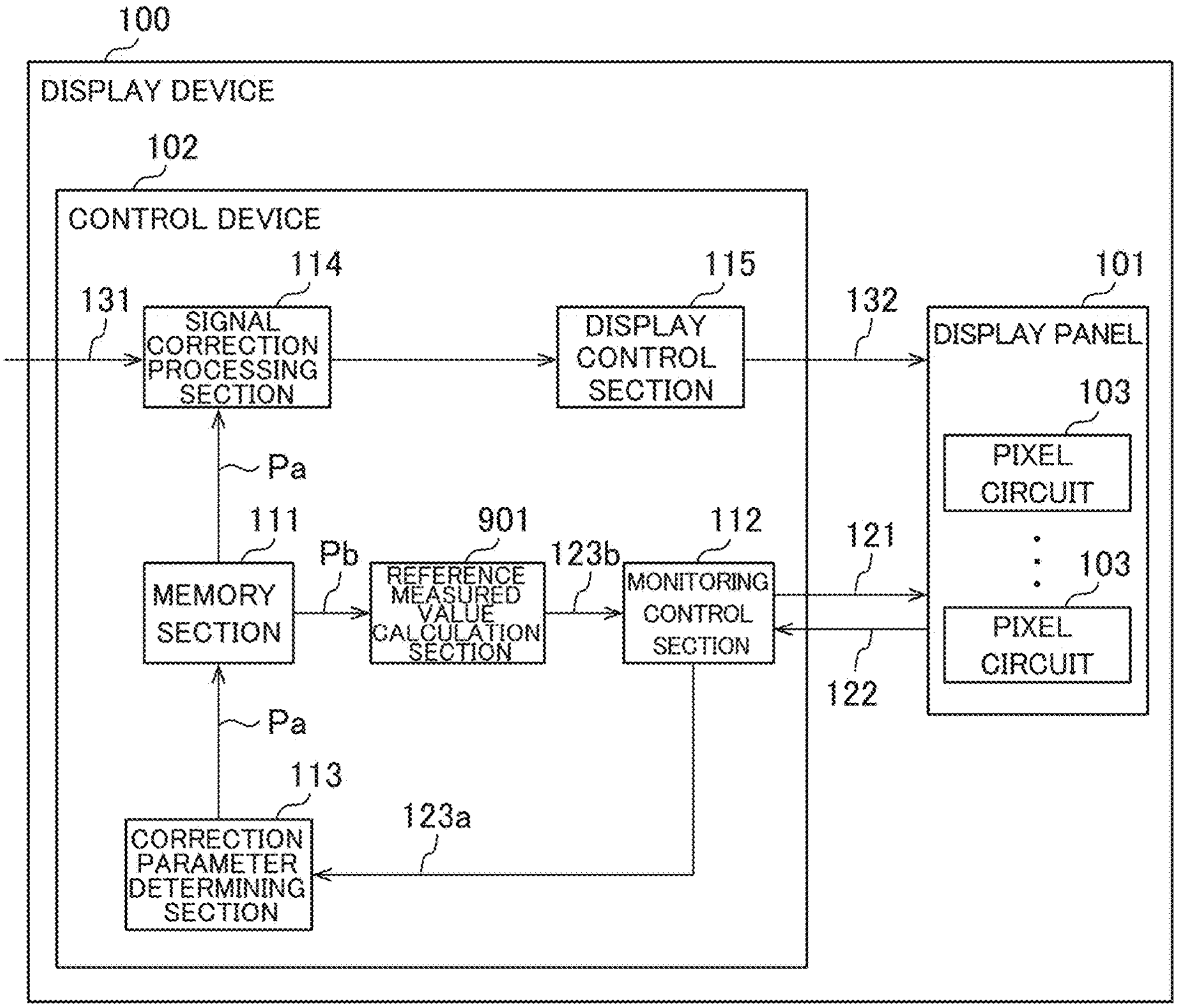
FIG. 9 is a block diagram of an example of a structure of a display device in accordance with Embodiment 2.
Figure 10:
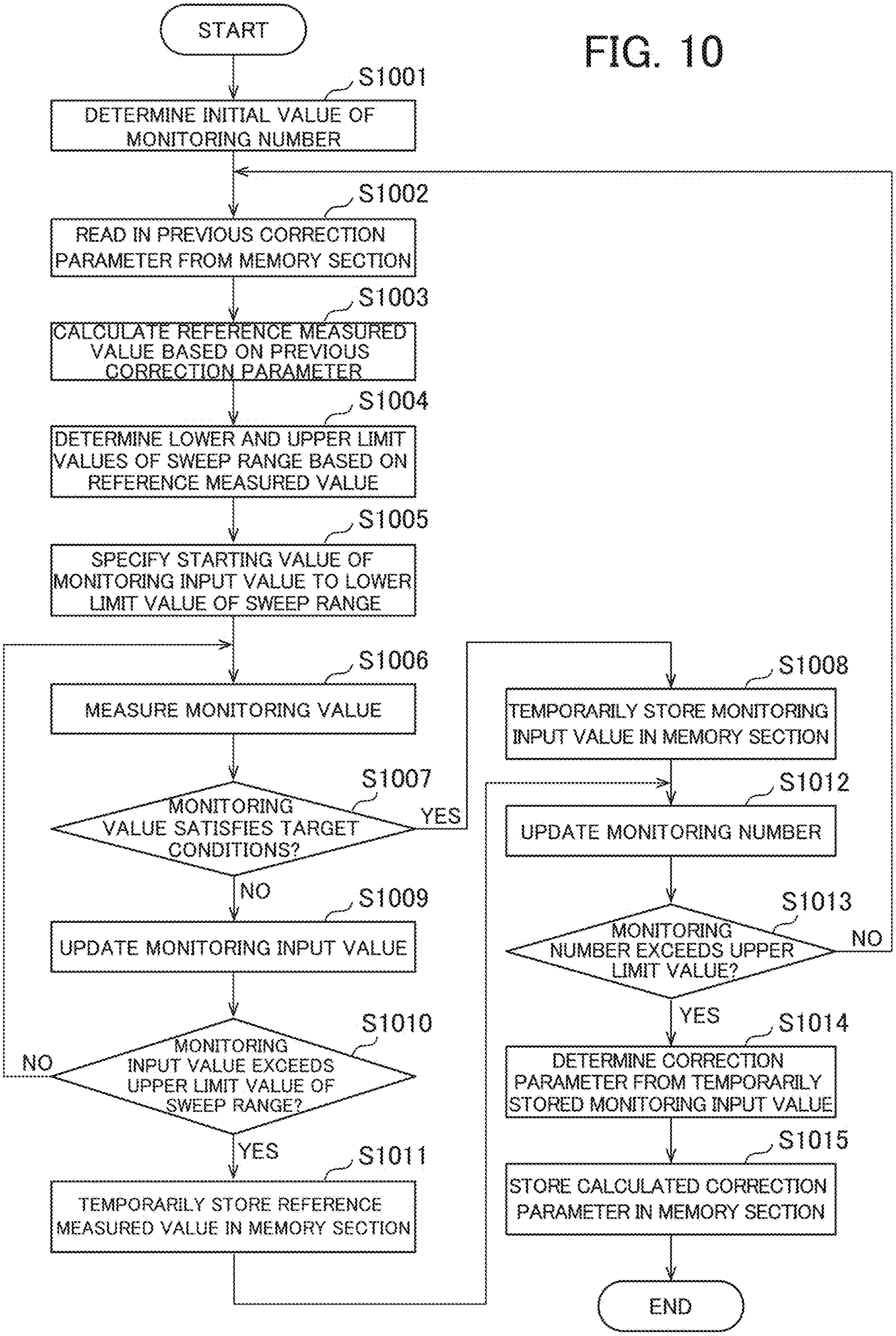
FIG. 10 is a flow chart representing an example of a process of obtaining a measured value in a control device in accordance with Embodiment 2.

A description is given of Embodiment 2 with reference to FIGS. 9 to 10. Note that identical and equivalent elements are denoted by the same reference numerals, and description thereof is not repeated. The members and processes of the present embodiment that have practically the same arrangement and function as the members and processes of Embodiment 1 are denoted by the same reference numerals, and description thereof is omitted. The description will focus on differences from Embodiment 1.

FIG. 9 is a block diagram of an example of a structure of the display device 100 in accordance with the present embodiment. The display device 100 shown as an example in FIG. 9 differs from the display device 100 shown as an example in FIG. 1 in that the display device 100 shown as an example in FIG. 9 includes a reference measured value calculation section 901. In addition, the memory section 111 in accordance with the present embodiment stores the correction parameter P, but does not store the measured value 123*a* and the reference measured value 123*b*.

The reference measured value calculation section 901 calculates the reference measured value 123*b* on the basis of a correction parameter Pb stored in the memory section 111. Specifically, the reference measured value calculation section 901 calculates the reference measured value 123*b* by inputting, to the conversion model F, the correction parameter Pb stored in the memory section 111 and a reference monitoring input value on reference current-voltage characteristics.

When a new correction parameter Pa is determined, the correction parameter determining section 113 causes the memory section 111 to store a new correction parameter Pa in place of the correction parameter Pb stored in the memory section 111.

FIG. 10 is a flow chart representing an example of a process of obtaining the measured value 123*a* related to a pixel circuit 103 in the control device 102 in accordance with Embodiment 2. In the process shown as an example in FIG. 10, the monitoring input value 121 indicates the voltage value of a voltage applied to at least one element selected from the group consisting of the drive transistor T2 and the light-emitting element L1. In addition, in the process shown as an example in FIG. 10, the monitoring value 122 indicates the current value of an electric current flowing in an element to which a voltage with a voltage value indicated by the monitoring input value 121 is applied.

In step S1001, the monitoring control section 112 determines n=1 which is the initial value of the monitoring number n. In step S1002, the reference measured value calculation section 901 reads out a previous correction parameter Pb from the memory section 111.

In step S1003, the reference measured value calculation section 901 calculates the voltage value Vb(n) which is a reference measured value on the basis of the previous correction parameter Pb. Specifically, the reference measured value calculation section 901 calculates the reference measured value 123*b* by inputting, to the conversion model F, the correction parameter Pb stored in the memory section 111 and a reference monitoring input value on reference current-voltage characteristics.

For instance, it is assumed that a combination of Pb1, Pb2, and Pb3 values are stored in the memory section 111 as the correction parameters Pb. In such a case, $V_o$ which is the reference measured value 123*b* is calculated by plugging $V_{std}$, the value of P1, the value of P2, and the value of P3 into the calculation formula, "$V_o$=Conversion Model F($V_{std}$, Pb1, Pb2, Pb3)." $V_{std}$ is a voltage value for which the current value that is the monitoring value 122 is a current threshold value in the reference current-voltage characteristics 701.

In step S1003, after the voltage value Vb(n) which is the reference measured value 123*b* is calculated, the control device 102 moves the process to step S1004. The process of steps S1004 to S1007 is substantially the same as the process of steps S503 to S506 shown as an example in FIG. 5, and detailed description thereof is omitted.

In step S1007, if the current value Im which is the monitoring value 122 satisfies the target conditions (Yes), the monitoring control section 112, in step S1008, causes the voltage value Vm which is the monitoring input value 121 for which the current value Im satisfies the target conditions to be temporarily stored as the measured value 123*a* in the memory section 111. Then, the control device 102 moves the process to step S1011. On the other hand, if the current value Im which is the monitoring value 122 does not satisfy the target conditions in step S1007 (No), the monitoring control section 112, in step S1009, updates the monitoring input value 121. The process of step S1009 is substantially the same as step S508 shown as an example in FIG. 5, and detailed description thereof is omitted. Then, the control device 102 moves the process to step S1010.

In step S1010, the monitoring control section 112 determines whether or not the voltage value Vm which is the monitoring input value 121 updated in step S1009 exceeds the upper limit value Vmax of the sweep range determined in step S1004. If the voltage value Vm does not exceed the upper limit value Vmax of the sweep range in step S1010 (No), the control device 102 returns the process to step S1006. On the other hand, if the voltage value Vm exceeds the upper limit value Vmax of the sweep range in step S1010 (Yes), the monitoring control section 112, in step S1011, causes the reference measured value 123*b* obtained in step S1003 to be temporarily stored as the measured value 123*a* in the memory section 111. A "Yes" in step S1010 indicates that the measured value 123*a* has not been obtained in the specified sweep range. In such a case, the reference measured value 123*b* which is a previous measured value is used as the measured value 123*a*. Thereafter, the control device 102 moves the process to step S1012. The process of steps S1012 to S1013 is substantially the same as the process of steps S511 to S512 shown as an example in FIG. 5, and detailed description thereof is omitted.

In step S1014, the correction parameter determining section 113 determines a new correction parameter Pa on the basis of the measured value 123*a* temporarily stored in the memory section 111 in step S1008 and step S1011. The process of step S1014 is substantially the same as step S513 shown as an example in FIG. 5, and detailed description thereof is omitted. Note that after the new correction parameter P is calculated, the measured value 123*a* temporarily stored in the memory section 111 may be deleted.

In step S1015, the correction parameter determining section 113 causes the memory section 111 to store the correction parameter Pa determined in step S1014 in place of the previous correction parameter Pb.

The process of obtaining the measured value 123*a* in the control device 102 in accordance with Embodiment 2 shown in FIG. 10 is not performed simultaneously across all the pixels in the display panel. Instead, the process is performed on, for example, one to a few tens of pixels at a time, and this is repeated until all the pixels undergo the process. Therefore, the memory section 111 only needs a small area to temporarily store the measured value 123. Therefore, as described above, the control device 102 in accordance with the present embodiment can reduce the size of the memory section 111 by only temporarily storing the measured value 123 in the memory section 111 as well as can achieve substantially the same effects as in Embodiment 1.

Embodiment 3

Figure 11:
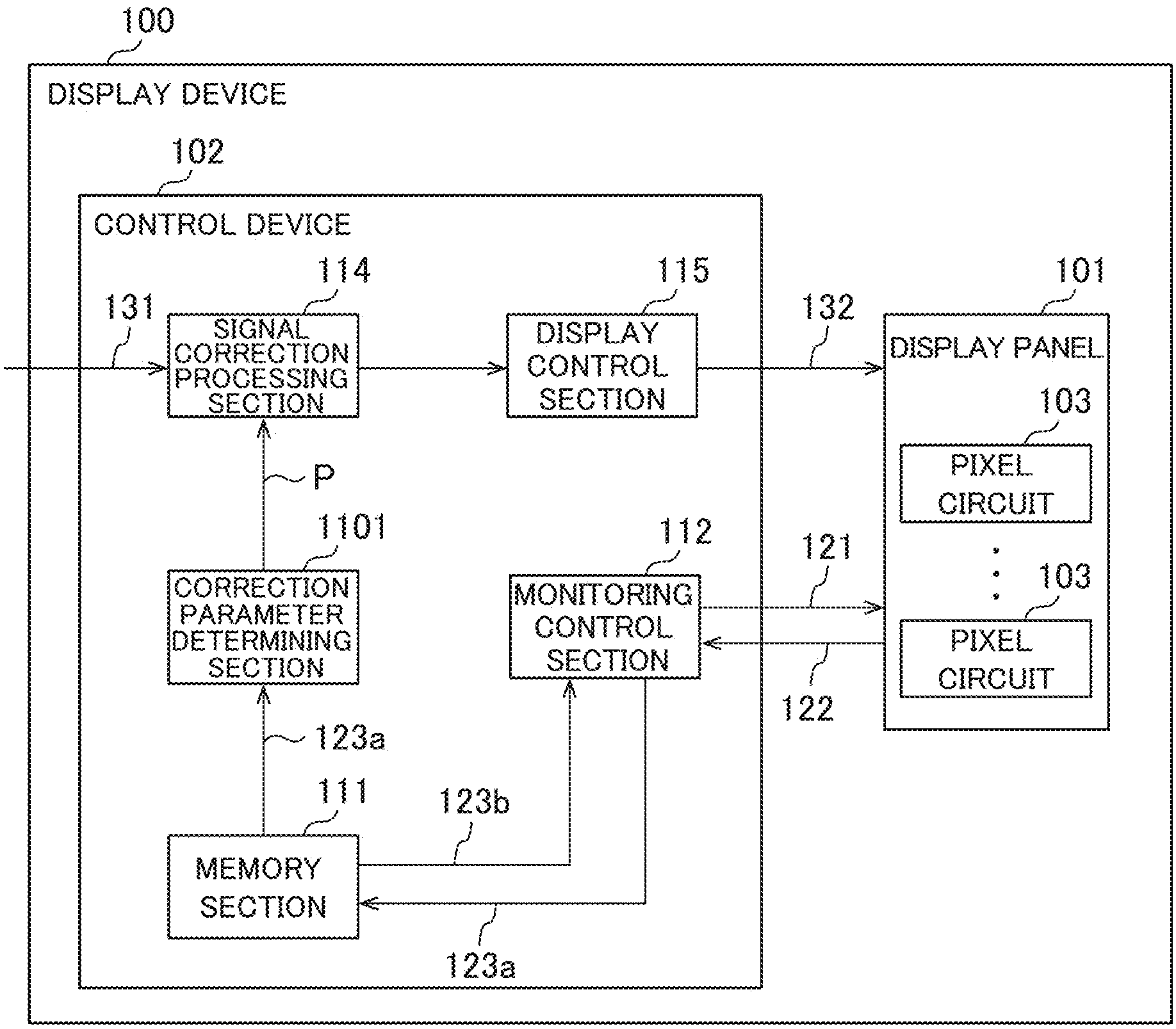
FIG. 11 is a block diagram of an example of a structure of a display device in accordance with Embodiment 3.
Figure 12:
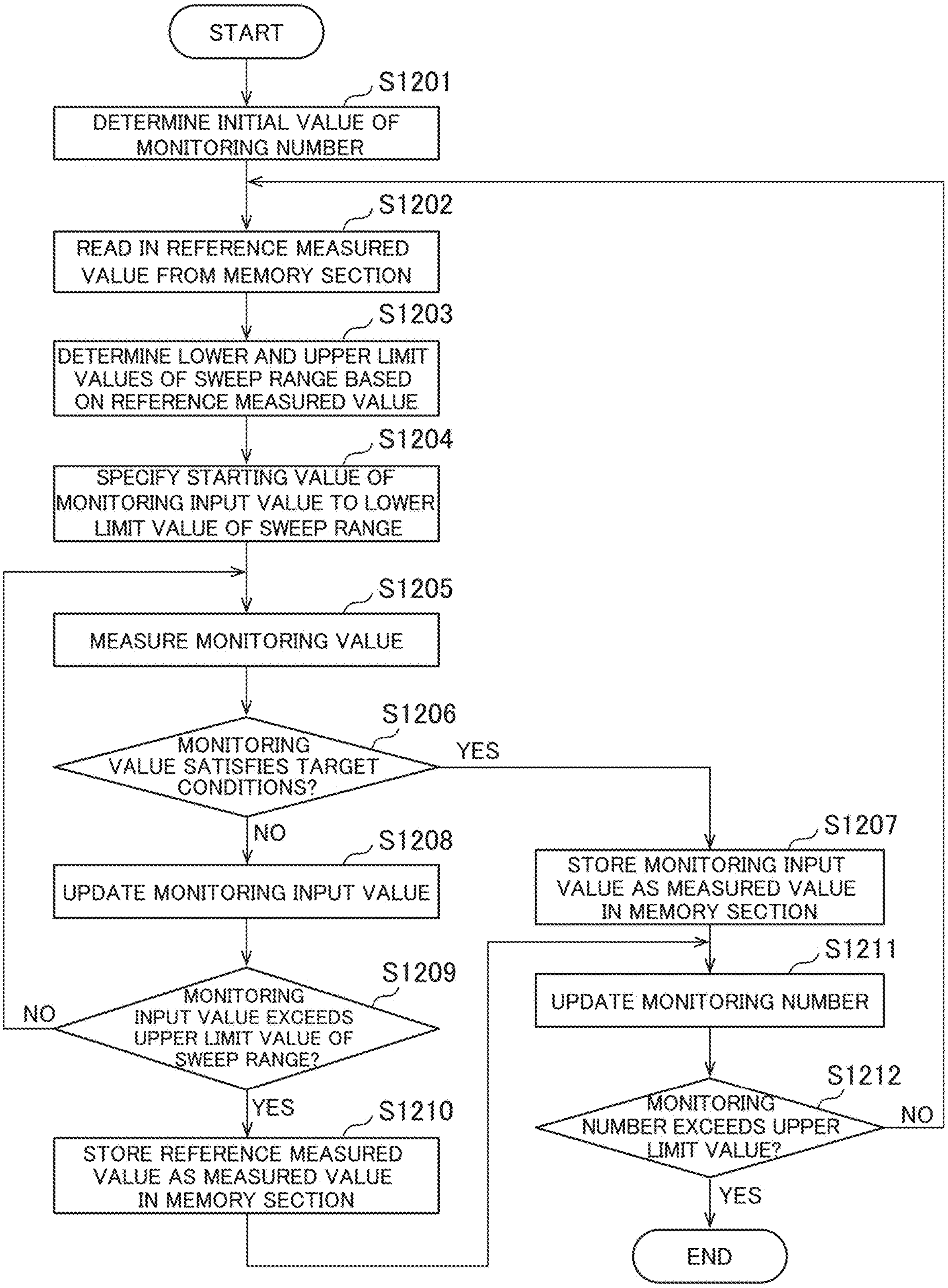
FIG. 12 is a flow chart representing an example of a process of obtaining a measured value in the control device in accordance with Embodiment 3.
Figure 13:
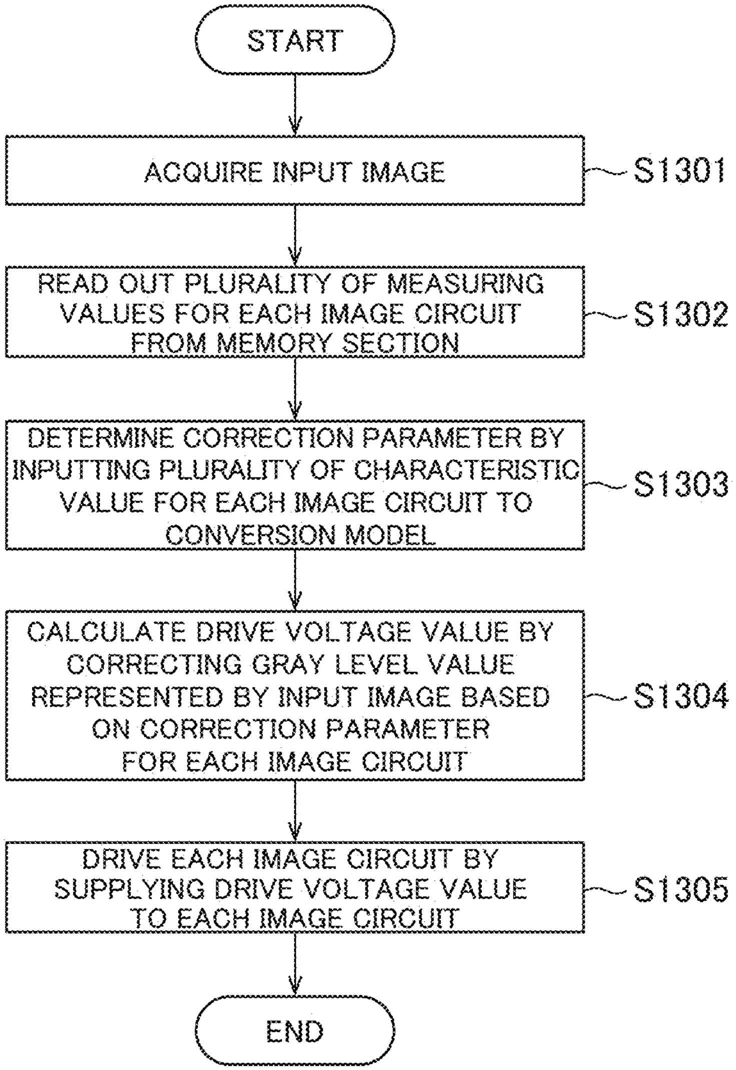
FIG. 13 is a flow chart representing an example of a process of compensation performed on a pixel circuit in the control device in accordance with Embodiment 3.

A description is given of Embodiment 3 with reference to FIGS. 11 to 13. Note that identical and equivalent elements are denoted by the same reference numerals, and description thereof is not repeated. The members and processes of the present embodiment that have practically the same arrangement and function as the members and processes of Embodiment 1 are denoted by the same reference numerals, and description thereof is omitted. The description will focus on differences from Embodiment 1.

FIG. 11 is a block diagram of an example of a structure of the display device 100 in accordance with the present embodiment. The display device 100 shown as an example in FIG. 11 differs from the display device 100 shown as an example in FIG. 1 in that the display device 100 shown as an example in FIG. 11 includes a correction parameter determining section 1101 in place of the correction parameter determining section 113. In addition, the memory section 111 in accordance with the present embodiment stores the measured value 123*a*, but does not store the correction parameter P. In other words, the memory section 111 stores the reference measured value 123*b* and the measured value 123*a*, but does not store the correction parameter P.

When a new measured value 123*a* is obtained by using the measured value 123*a* stored in the memory section 111 as the reference measured value 123*b*, the monitoring control section 112 in accordance with the present embodiment causes the memory section 111 to store this new measured value 123*a* in place of the measured value 123*a* stored in the memory section 111.

The correction parameter determining section 1101 determines the correction parameter P on the basis of the new measured value 123*a* stored in the memory section 111.

FIG. 12 is a flow chart representing an example of a process of obtaining the measured value 123*a* in the control device 102 in accordance with Embodiment 3.

In step S1201, the monitoring control section 112 determines n=1 which is the initial value of the monitoring number n. Then, the monitoring control section 112 determines the measured value 123*a* for each monitoring number n by performing the process of steps S1202 to S1212. In other words, the monitoring control section 112 repeats the process of steps S1202 to S1212 until the monitoring number n exceeds the number N of correction parameters P which is an upper limit value of the monitoring number n, to obtain the measured value 123*a*. Then, if the monitoring number n exceeds the number N of correction parameters P in step S512, the control device 102 terminates the process of obtaining the measured value 123*a*. Note that the process of steps S1201 to S1212 is substantially the same as the process of steps S501 to S512 shown as an example in FIG. 5.

FIG. 13 is a flow chart representing an example of a process of compensation performed on the pixel circuits 103 in the control device 102 in accordance with the present embodiment.

In step S1301, the signal correction processing section 114 acquires an input image. In step S1302, the correction parameter determining section 1101 reads out the N measured values 123*a* for each pixel circuit 103 from the memory section 111.

In step S1303, the correction parameter determining section 1101 determines the correction parameter P by inputting the N measured values 123*a* read out in step S1302 for each the pixel circuit 103 to the conversion model F. Then, the control device 102 moves the process to step S1304. The process of steps S1304 to S1305 is substantially the same as the process of steps S803 to S804 shown as an example in FIG. 8, and detailed description thereof is omitted.

As described above, the control device 102 in accordance with the present embodiment can reduce the size of the memory section 111 by not storing the correction parameter P in the memory section 111 as well as can achieve substantially the same effects as in Embodiment 1.

Embodiment 4

Figure 14:
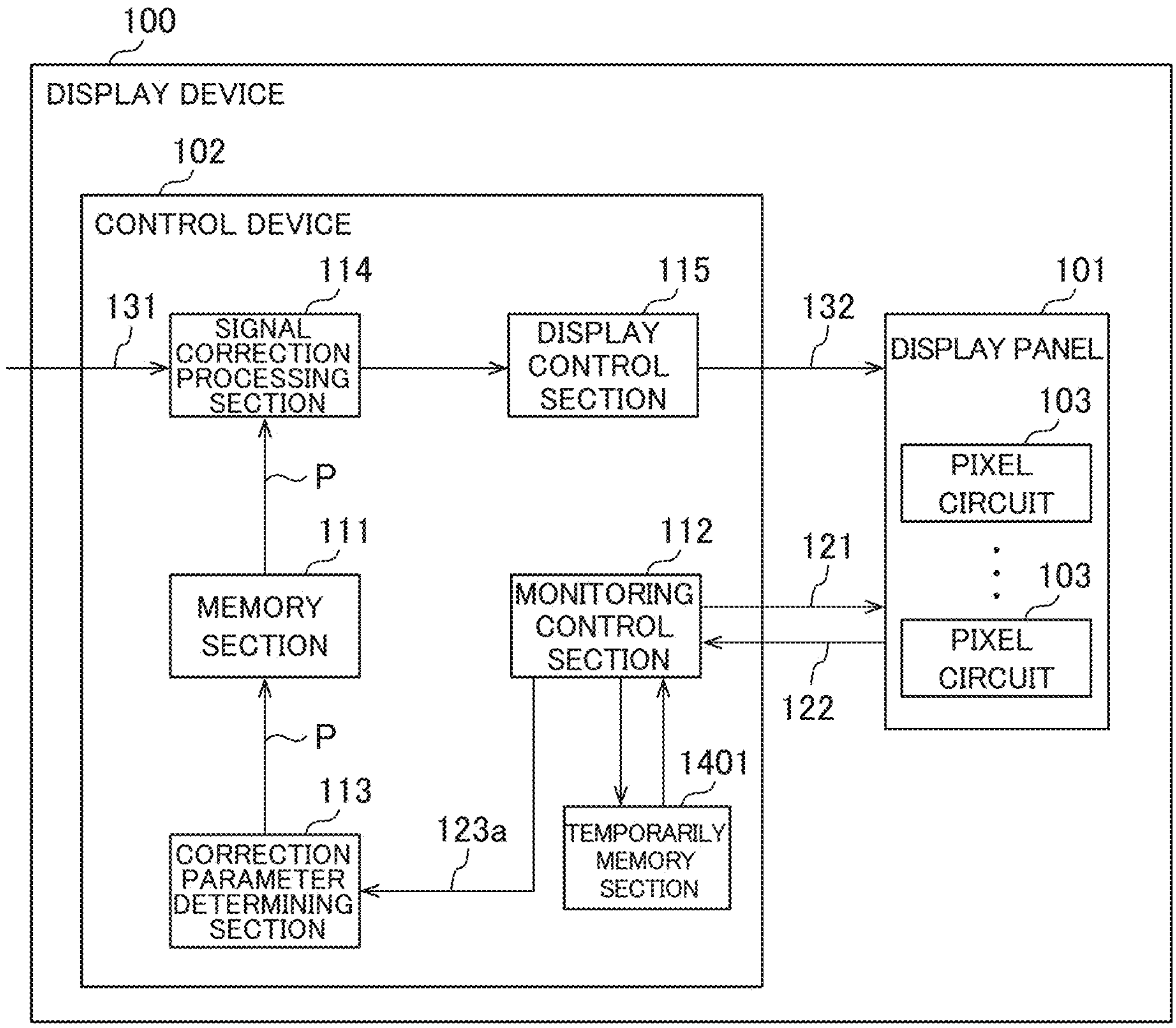
FIG. 14 is a block diagram of an example of a structure of a display device in accordance with Embodiment 4.
Figure 15:
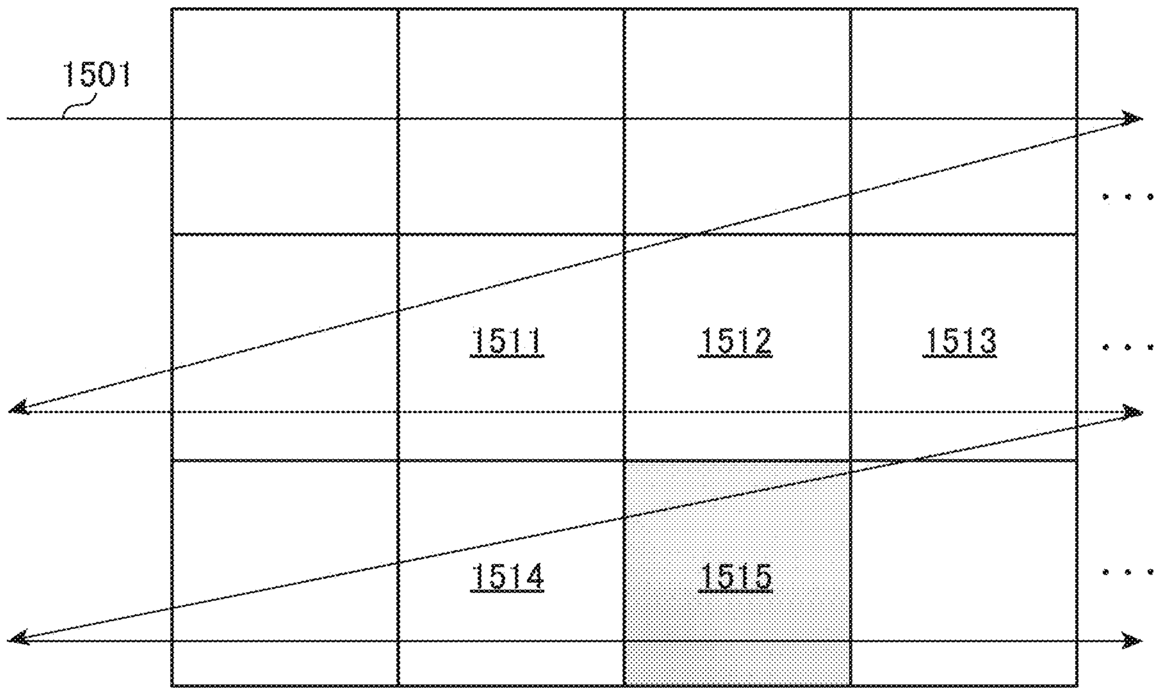
FIG. 15 is an example of an arrangement of a plurality of subpixels.

A description is given of Embodiment 4 with reference to FIGS. 14 to 15. Note that identical and equivalent elements are denoted by the same reference numerals, and description thereof is not repeated. The members and processes of the present embodiment that have practically the same arrangement and function as the members and processes of Embodiment 1 are denoted by the same reference numerals, and description thereof is omitted. The description will focus on differences from Embodiment 1.

FIG. 14 is a block diagram of an example of a structure of the display device 100 in accordance with the present embodiment. The display device 100 shown as an example in FIG. 14 differs from the display device 100 shown as an example in FIG. 1 in that the display device 100 shown as an example in FIG. 14 includes a temporarily memory section 1401.

The temporarily memory section 1401 temporarily stores the measured value 123*a*. The temporarily memory section 1401 includes, for example, a flip-flop circuit or an SRAM (static random access memory).

The monitoring control section 112 obtains the plurality of measured values 123*a* related respectively to characteristics of the plurality of pixel circuits 103 adjacent to the pixel circuit 103. The monitoring control section 112 causes the temporarily memory section 1401 to store the plurality of obtained measured values 123*a*. The plurality of pixel circuits 103 adjacent to the pixel circuit 103 are disposed in locations in the left and right directions, up/down directions, and diagonal directions of the pixel circuits 103.

For instance, the lower limit value of the sweep range is the smallest of the plurality of previously obtained measured values 123*a* related to characteristics of the plurality of pixel circuits 103. In addition, for example, the upper limit value of the sweep range is the largest of the plurality of previously obtained measured values 123*a* related to characteristics of the plurality of pixel circuits 103.

FIG. 15 is an example of an arrangement of a plurality of subpixels. Assume that each rectangle shown as an example in FIG. 15 represents a pixel. For example, the monitoring control section 112 obtains the measured value 123*a* for each pixel circuit 103 of a subpixel sequentially in the direction indicated by arrow 1501 shown as an example in FIG. 15. In other words, the monitoring control section 112 obtains the measured value 123*a* for each pixel circuit 103 sequentially from the top row toward the bottom row for the pixel circuits 103 of the plurality of subpixels arranged in a matrix. Specifically, the monitoring control section 112 obtains the measured value 123*a* for the pixel circuit 103 included in each subpixel for each row in the plurality of pixel circuits 103 from one end toward the other end. The monitoring control section 112 causes the temporarily memory section 1401 to store the plurality of obtained measured values 123*a*.

Assume as an example that the pixel circuit 103 of a subpixel 1515 shown as an example in FIG. 15 is the pixel circuit 103 that is a measurement target. In the current context, the monitoring control section 112 obtains the measured value 123*a* for each pixel circuit 103 sequentially from the top row toward the bottom row as indicated as an example by arrow 1501. Then, the monitoring control section 112 causes the temporarily memory section 1401 to store the obtained measured value 123*a*. Therefore, when the monitoring control section 112 obtains the measured value 123*a* for the pixel circuit 103 of the subpixel 1515, the measured values 123*a* for subpixels 1511 to 1514 are already stored in the temporarily memory section 1401.

By the display device 100 continuously displaying an image on the display panel 101, the elements included in the plurality of adjacent pixel circuits 103 come to share substantially the same characteristics. As a result, by the display device 100 continuously displaying an image on the display panel 101, the measured values 123*a* for the plurality of adjacent pixel circuits 103 become substantially the same. For example, when the pixel circuit 103 that is a measurement target is the pixel circuit 103 of the subpixel 1515, the measured values 123*a* for the pixel circuits 103 of the subpixels 1511 to 1514 could be substantially the same as the measured value 123*a* for the pixel circuit 103 of the subpixel 1515.

Accordingly, when the pixel circuit 103 that is a measurement target is the pixel circuit 103 of the subpixel 1515, the monitoring control section 112 determines the sweep range on the basis of the measured values 123*a* for the pixel circuits 103 of the subpixels 1511 to 1514. In the current context, the measured values 123*a* for the pixel circuits 103 of the subpixels 1511 to 1514 are measurements before the measurement on the subpixel 1515, in other words, previously obtained measured values.

For instance, when the pixel circuit 103 that is a measurement target is the pixel circuit 103 of the subpixel 1515, the monitoring control section 112 determines, as the lower limit value of the sweep range, the smallest of the measured values 123*a* for the pixel circuits 103 of the subpixels 1511 to 1514. Alternatively, the monitoring control section 112 may determine, as the lower limit value of the sweep range, the smallest of the measured values 123*a* for at least two of the pixel circuits 103 for the subpixels 1511 to 1514.

Likewise, for example, when the pixel circuit 103 that is a measurement target is the pixel circuit 103 of the subpixel 1515, the monitoring control section 112 determines, as the upper limit value of the sweep range, the largest of the measured values 123*a* for the pixel circuits 103 of the subpixels 1511 to 1514. Alternatively, the monitoring control section 112 may determine, as the upper limit value of the sweep range, the largest of the measured values 123*a* for at least two of the pixel circuits 103 for the subpixels 1511 to 1514.

Alternatively, for example, when the pixel circuit 103 that is a measurement target is the pixel circuit 103 of the subpixel 1515, the monitoring control section 112 determines, as the reference measured value 123*b* for the pixel circuit 103 of the subpixel 1515, a representative one of the measured values 123*a* for the pixel circuits 103 of the subpixels 1511 to 1514. The representative value is, for example, an average value, a median value, or the most frequent value of the measured values 123*a* for the pixel circuits 103 of the subpixels 1511 to 1514. Hence, even when there are abnormal values among the measured values 123*a* for the pixel circuits 103 of the subpixels 1511 to 1514, the abnormal values would have less adverse effect.

As described above, the control device 102 in accordance with the present embodiment can reduce the time required in the sweeping for obtaining the measured value 123*a* for the pixel circuit 103 that is a measurement target by storing the measured values 123*a* for the peripheral pixel circuits 103 in the temporarily memory section 1401 as well as can achieve substantially the same effects as in Embodiment 1. More particularly, as described above, since the measured values 123*a* for the pixel circuits 103 of the subpixels 1511 to 1514 could be substantially the same as the measured value 123*a* for the pixel circuit 103 of the subpixel 1515, it may be possible to specify a narrower range if a sweep range is specified for the subpixel 1515 based on the measured values 123*a* for the peripheral pixel circuits of the subpixel 1515. From this description, the time required in the sweeping can be reduced by the process in accordance with the present embodiment.

Furthermore, in the control device 102 in accordance with the present embodiment, since the measured value 123*a* is not stored in the memory section 111, the size of the memory section 111 can be reduced. Furthermore, in the control device 102 in accordance with the present embodiment, there is no need to read out the measured value 123*a* from the memory section 111 when the monitoring control section 112 obtains the measured value 123*a*. Therefore, in the control device 102 in accordance with the present embodiment, the data bandwidth in the memory section 111 can be reduced when the monitoring control section 112 obtains the measured value 123*a*.

Embodiment 5

A description is given of Embodiment 5 with reference to FIGS. 16 to 21. Note that identical and equivalent elements are denoted by the same reference numerals, and description thereof is not repeated. The members and processes of the present embodiment that have practically the same arrangement and function as the members and processes of Embodiment 1 are denoted by the same reference numerals, and description thereof is omitted. The description will focus on differences from Embodiment 1.

Figure 16:
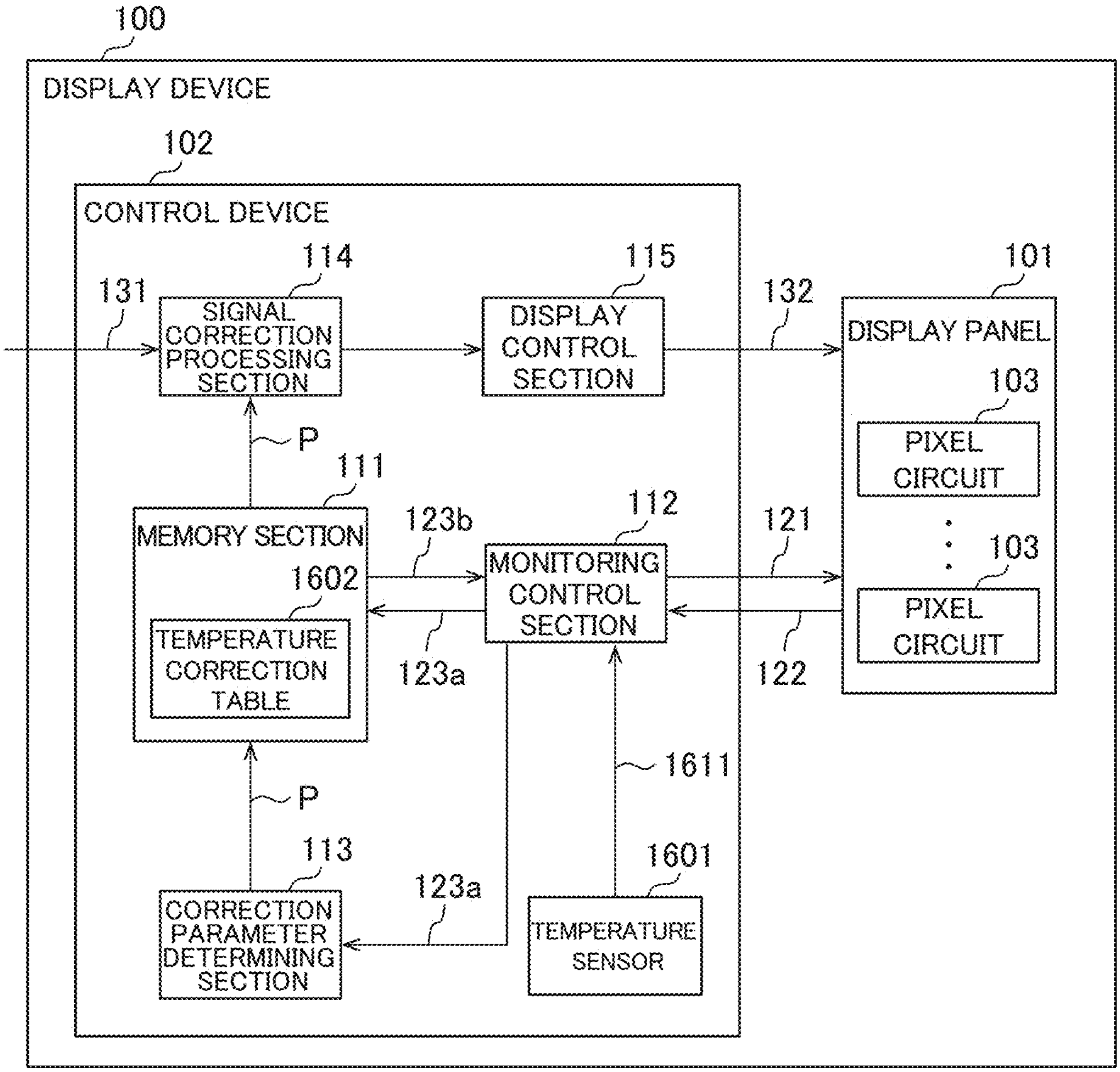
FIG. 16 is a block diagram of an example of a structure of a display device in accordance with Embodiment 5.

FIG. 16 is a block diagram of an example of a structure of the display device 100 in accordance with the present embodiment. The display device 100 shown as an example in FIG. 16 differs from the display device 100 shown as an example in FIG. 1 in that there is provided a temperature sensor 1601.

The temperature sensor 1601 measures the temperature of the pixel circuit 103 and outputs a temperature value 1611. A temperature correction table 1602 stores a temperature conversion value for each temperature in an associated manner.

The monitoring control section 112 in accordance with the present embodiment corrects, on the basis of the temperature value 1611, the monitoring value 122 measured by supplying the monitoring input value 121 to the pixel circuit 103, and when the corrected monitoring value 122 satisfies the target conditions, obtains the monitoring input value 121 as the measured value 123. Specifically, the monitoring control section 112 identifies a temperature conversion value associated with the temperature value 1611 in the temperature correction table 1602. Then, the monitoring control section 112 corrects the measured monitoring value 122 on the basis of the identified temperature conversion value, and when the corrected monitoring value 122 satisfies the target conditions, obtains the monitoring input value 121 as the measured value 123.

Figure 17:
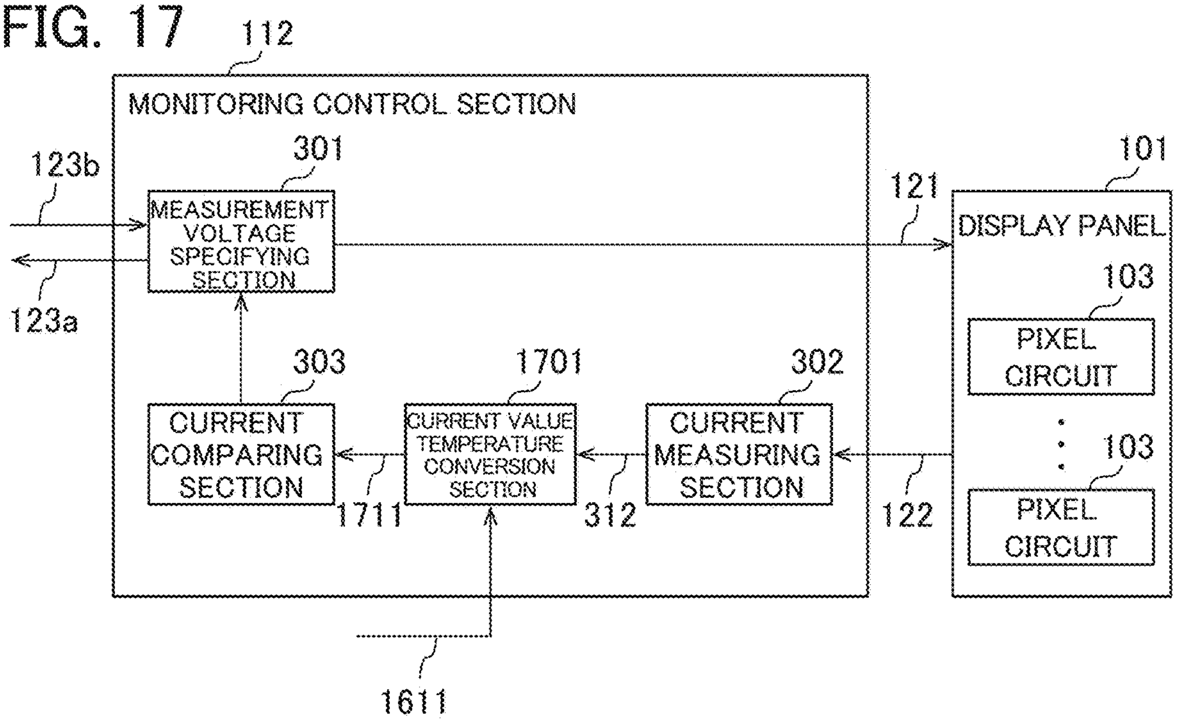
FIG. 17 is a block diagram of an example of a structure of a monitoring control section in accordance with Embodiment 5.

FIG. 17 is a block diagram of an example of a structure of the monitoring control section 112 in accordance with the present embodiment. The monitoring control section 112 shown as an example in FIG. 17 differs from the monitoring control section 112 shown as an example in FIG. 3 in that the monitoring control section 112 shown as an example in FIG. 17 includes a current value temperature conversion section 1701.

The current value temperature conversion section 1701 corrects a current value that is the monitoring value 122 on the basis of the temperature value 1611 and determines a corrected monitoring value 1711 that is a corrected current value $I_{Tm}$. Specifically, the current value temperature conversion section 1701 corrects the current value that is the monitoring value 122 and determines the corrected monitoring value 1711 that is the corrected current value $I_{Tm}$, by applying a temperature conversion value in accordance with the temperature value 1611 to the current value that is the monitoring value 122. For example, the current value temperature conversion section 1701 multiplies the current value that is the monitoring value 122 by a constant to determine the corrected monitoring value 1711, by applying the temperature conversion value to the current value that is the monitoring value 122.

For instance, it is assumed that when the temperature value 1611 is a reference temperature Tstd° C., the current value that is the monitoring value 122 measured by supplying a voltage value Vstd which is the monitoring input value 121 to the pixel circuit 103 is equal to $I_B$. Meanwhile, it is assumed that the monitoring control section 112 has measured the monitoring value 122 that is the current value $I_T$ by supplying $V_T$ which is a monitoring input value to the pixel circuit 103 when the temperature value 1611 is a temperature T° C. In such a case, the temperature conversion value at the time of the temperature T° C. is determined in advance to be $I_B/I_T$. If the reference temperature is lower than the temperature indicated by the temperature value 1611, the temperature conversion value is a value that is lower than 1. On the other hand, if the reference temperature is higher than the temperature indicated by the temperature value 1611, the temperature conversion value is a value that is higher than 1.

Figure 18:
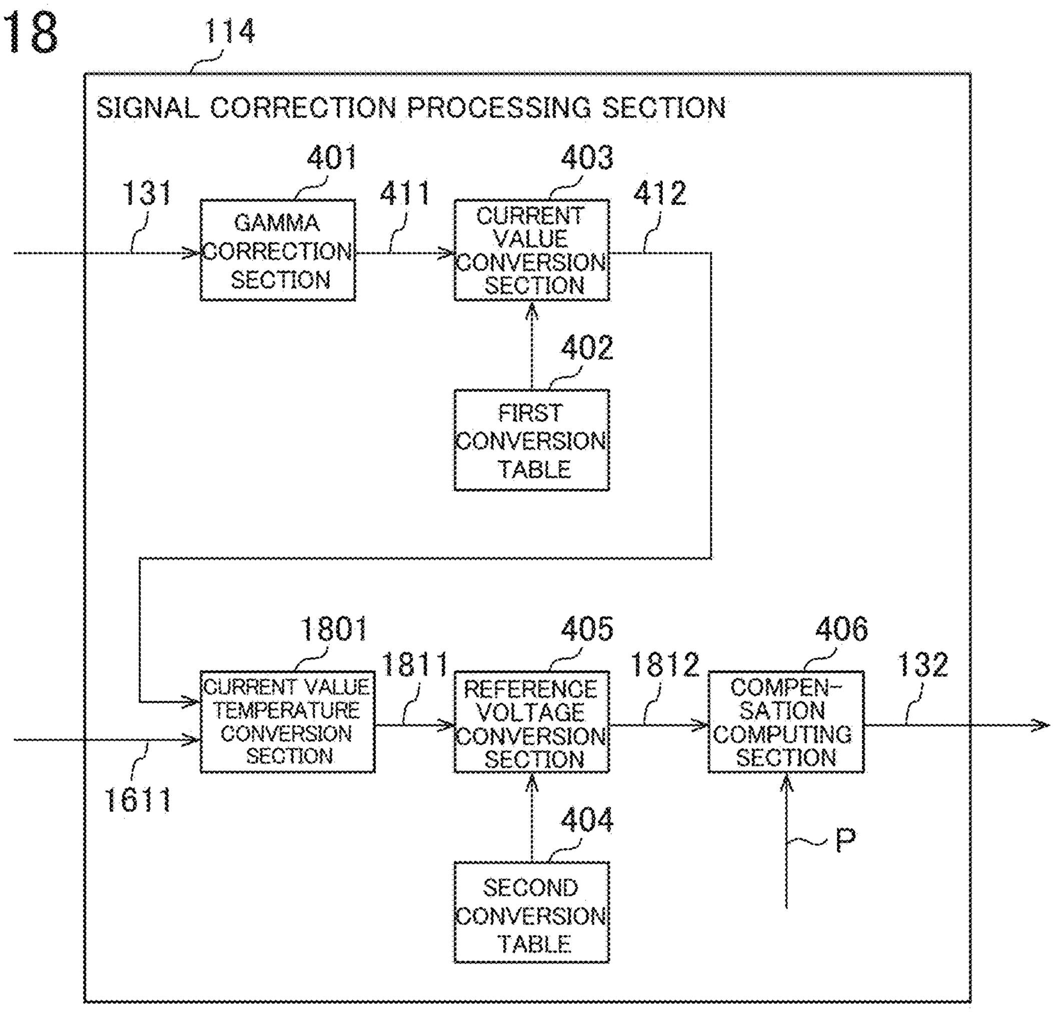
FIG. 18 is a block diagram of an example of a structure of a signal correction processing section in accordance with Embodiment 5.

FIG. 18 is a block diagram of an example of a structure of the signal correction processing section 114 in accordance with the present embodiment. The signal correction processing section 114 shown as an example in FIG. 18 differs from the signal correction processing section 114 shown as an example in FIG. 4 in that the signal correction processing section 114 shown as an example in FIG. 18 includes a current value temperature conversion section 1801.

The current value temperature conversion section 1801 corrects the current value 412 outputted from the current value conversion section 403 on the basis of the temperature value 1611. Specifically, the current value temperature conversion section 1801 corrects the current value 412 by applying a temperature conversion value in accordance with the temperature value 1611 to the current value 412 outputted from the current value conversion section 403. The temperature conversion value is substantially the same as the current value temperature conversion section 1701 shown as an example in FIG. 17, and detailed description thereof is omitted.

For instance, the current value temperature conversion section 1801 multiplies the current value 412 by a constant by applying the temperature conversion value to the current value 412, to correct the current value 412. The current value temperature conversion section 1801 outputs a corrected current value 1811 that is the corrected current value to the reference voltage conversion section 405.

The reference voltage conversion section 405 converts the corrected current value 1811 to a voltage value 1812 in accordance with the type of the element related to the characteristic represented by the measured value 123*a*, by using the data stored in the second conversion table 404.

Figure 19:
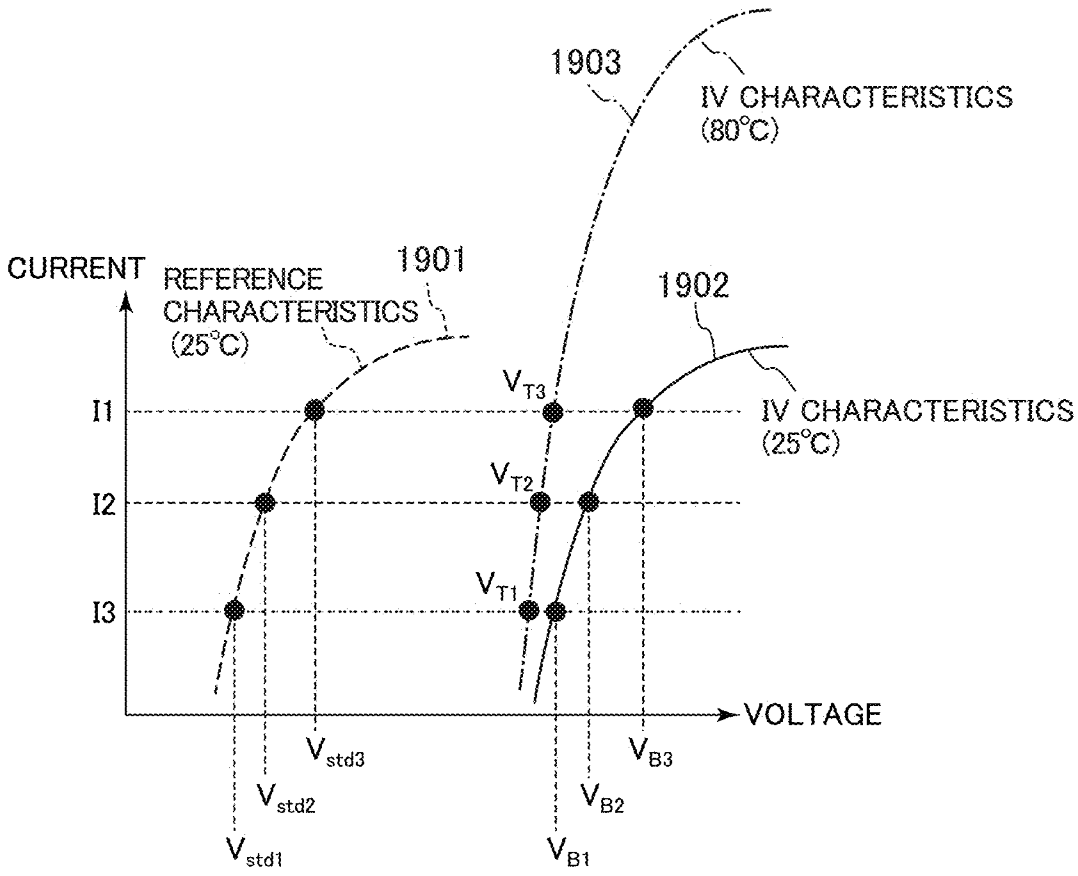
FIG. 19 is a graph representing an example of current-voltage characteristics at different temperatures.

FIG. 19 is a graph representing an example of current-voltage characteristics at different temperatures. In FIG. 19, voltage values are plotted on the horizontal axis, and current values are plotted on the vertical axis. A curve 1901 represents current-voltage characteristics when the temperature value 1611 is 25° C. which is the reference temperature, before a temporal change in a characteristic of the pixel circuit 103. A curve 1902 represents current-voltage characteristics when the temperature value 1611 is 25° C. which is the reference temperature, after a temporal change in a characteristic of the pixel circuit 103. A curve 1903 represents current-voltage characteristics when the temperature value 1611 is 80° C. after substantially the same temporal change in a characteristic of the pixel circuit 103 as in the characteristic of the pixel circuit 103 represented by the curve 1902. Voltage values $V_{std1}$, $V_{std2}$, and $V_{std3}$ are the respective monitoring input values 121 for which current values I1, I2, and I3 that are the monitoring values 122 are measured at the temperature of 25° C. before a temporal change in a characteristic of the pixel circuit 103.

Voltage values $V_{B1}$, $V_{B2}$, and $V_{B3}$ are the respective monitoring input values 121 for which the current values I1, I2, and I3 that are the monitoring values 122 are measured when the pixel circuits 103 has a temperature of 25° C. after a temporal change. The correction parameter determining section 113 determines the correction parameter P by inputting the voltage values $V_{std1}$, $V_{std2}$, and $V_{std3}$ into the conversion model F so as to respectively output the voltage values $V_{B1}$, $V_{B2}$, and $V_{B3}$. Hence, the correction parameter determining section 113 determines the current-voltage characteristics represented by the curve 1902.

Meanwhile, voltage values $V_{T1}$, $V_{T2}$, and $V_{T3}$ are the respective monitoring input values 121 for which the current values I1, I2, and I3 that are the monitoring values 122 are measured when the pixel circuit 103 has a temperature of 80° C. after a temporal change. As represented as an example by the curve 1903, at the temperature of 80° C., the voltage values $V_{T1}$, $V_{T2}$, and $V_{T3}$ for which the current values I1, I2, and I3 are measured after a temporal change differ from the voltage values $V_{B1}$, $V_{B2}$, and $V_{B3}$. In other words, the correction parameter determining section 113 is not capable of appropriately identifying the current-voltage characteristics obtained by measurement after a temporal change when the reference temperature differs even if the current-voltage characteristics obtained by measurement at the time of the reference temperature before a temporal change is geometrically converted.

Accordingly, the monitoring control section 112 applies, to the monitoring value 122 measured after a temporal change and when the pixel circuit 103 has a temperature of 80° C., a temperature conversion value in accordance with this monitoring value 122. Specifically, the current value temperature conversion section 1701 converts the monitoring value 122 measured at the temperature of 80° C. to the monitoring value 122 measured at 25° C. which is the reference temperature. As a result, the monitoring control section 112 can obtain the converted monitoring value 122 at the temperature of 80° C. as the measured value 123*a* obtained at 25° C. which is the reference temperature. Hence, the correction parameter determining section 113 can determine the same correction parameter P as the correction parameter P that defines the conversion model F for the reference temperature even in a case of a different temperature from the reference temperature after a temporal change.

Figure 20:
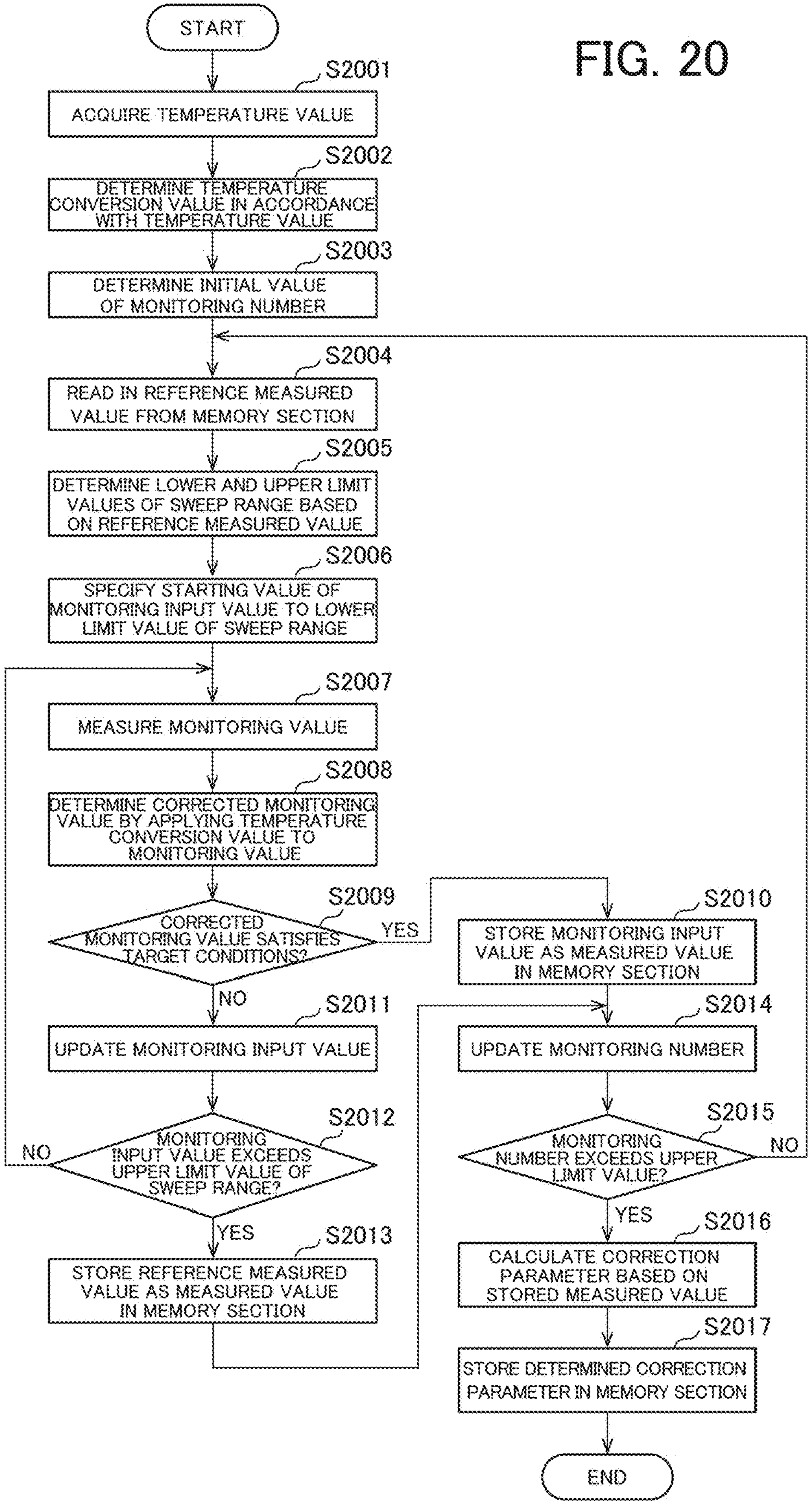
FIG. 20 is a flow chart representing an example of a process of obtaining a measured value in a control device in accordance with Embodiment 5.

FIG. 20 is a flow chart representing an example of a process of obtaining the measured value 123*a* in the control device 102 in accordance with the present embodiment.

Note that it is assumed that the temperature correction table 1602 is already stored in the memory section 111 when the control device 102 starts the process of step S2001. The temperature conversion value is determined through experiments, by changing the ambient temperature of the display device 100 and measuring the monitoring value 122, which is a current value flowing in the pixel circuit 103, and the temperature value 1611. In other words, the temperature conversion value is determined through experiments, by while changing the ambient temperature of the display device 100, measuring the monitoring value 122 and the temperature value 1611 at each temperature. Hence, the temperature correction table 1602 is generated which stores a temperature conversion value for each temperature in an associated manner.

In step S2001, the monitoring control section 112 acquires the temperature value 1611 measured by the temperature sensor 1601. In step S2002, the monitoring control section 112 determines a temperature conversion value in accordance with the temperature value 1611. Specifically, the current value temperature conversion section 1701 identifies a temperature conversion value associated with the temperature value 1611 in the temperature correction table 1602. Then, the control device 102 moves the process to step S2003. The process of steps S2003 to S2007 is substantially the same as steps S501 to S505 shown as an example in FIG. 5, and detailed description thereof is omitted.

After the monitoring control section 112 measures the current value $I_T$ which is the monitoring value 122 by applying a voltage value $V_T$ which is the monitoring input value 121 to the pixel circuit 103 in step S2007, the current value temperature conversion section 1701, in step S2008, determines the current value $I_{Tm}$ which is the corrected monitoring value 1711 by applying the temperature conversion value acquired in step S2002 to the current value $I_T$ which is the measured monitoring value 122. The current value $I_{Tm}$ represents substantially the same current value as the current value measured by applying a voltage that has the voltage value Vm which is the monitoring input value for the monitoring number n to the pixel circuit 103 that is a measurement target in a state of the reference temperature after a temporal change in a characteristic of the pixel circuit 103.

In step S2009, the monitoring control section 112 determines whether or not the current value $I_{Tm}$ which is the corrected monitoring value 1711 satisfies the target conditions. Specifically, the current comparing section 303 determines whether or not the current value $I_{Tm}$ exceeds the current threshold value for the monitoring number n. If the current value $I_{Tm}$ exceeds the current threshold value for the monitoring number n (Yes), the current comparing section 303 determines that the current value $I_{Tm}$ satisfies the target conditions. On the other hand, if the current value $I_{Tm}$ is less than or equal to the current threshold value for the monitoring number n (No), the current comparing section 303 determines that the current value $I_{Tm}$ does not satisfy the target conditions.

If the current value $I_{Tm}$ which is the corrected monitoring value 1711 satisfies the target conditions in step S2009 (Yes), the monitoring control section 112, in step S2010, causes the memory section 111 to store the voltage value $V_T$ which is the monitoring input value 121 as the measured value 123*a*. Hence, when the temperature value 1611 differs from the reference temperature, the monitoring control section 112 can cause the memory section 111 to store, as the measured value 123*a*, a voltage value that is the monitoring input value 121 for which the monitoring value 122 is measured at the time of the reference temperature. Then, the control device 102 moves the process to step S2014.

On the other hand, if the current value $I_{Tm}$ which is the corrected monitoring value 1711 does not satisfy the target conditions in step S2009 (No), the control device 102 moves the process to step S2011. The process of steps S2011 to S2017 is substantially the same as the process of steps S508 to S514 shown as an example in FIG. 5, and detailed description thereof is omitted.

Figure 21:
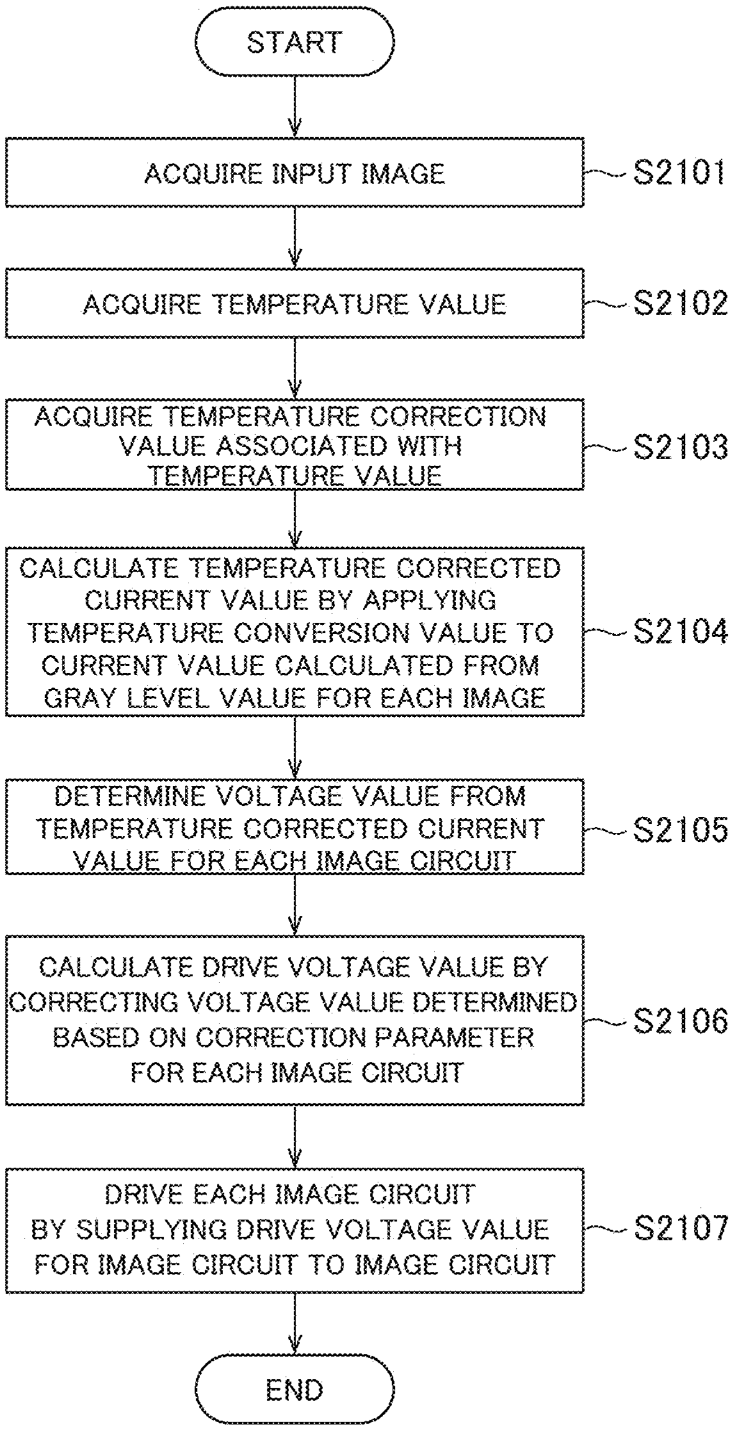
FIG. 21 is a flow chart representing an example of a process of compensation performed on a pixel circuit in the control device in accordance with Embodiment 5.

FIG. 21 is a flow chart representing an example of a process of compensation performed on the pixel circuit 103 in the control device 102 in accordance with the present embodiment. Assume that the measured value 123*a* and the correction parameter P are already stored in the memory section 111 when the control device 102 starts the process shown as an example in FIG. 21.

In step S2101, the signal correction processing section 114 acquires an input image. In step S2102, the current value temperature conversion section 1801 acquires the temperature value 1611 measured by the temperature sensor 1601.

In step S2103, the current value temperature conversion section 1801 acquires a temperature conversion value associated with the temperature value 1611 measured in step S2102 shown in the temperature correction table 1602.

In step S2104, the current value temperature conversion section 1801 calculates the corrected current value 1811 by applying the temperature conversion value acquired in step S2103 to the current value 412 calculated from the gray level value 131 represented by the input image for each pixel.

In step S2105, the reference voltage conversion section 405 determines the voltage value 1812 from the corrected current value 1811 calculated in step S2104 for each pixel circuit 103.

In step S2106, the compensation computing section 406 calculates the drive voltage value 132 by correcting the voltage value 1812 determined in step S2105, on the basis of the correction parameter P stored in the memory section 111 for each pixel circuit 103. In step S2107, the signal correction processing section 114 drives each pixel circuit 103 by supplying the drive voltage value 132 for each pixel circuit 103 to each pixel circuit 103.

From the description above, when the pixel circuit 103 has a different temperature from the reference temperature, the control device 102 in accordance with the present embodiment is capable of causing the light-emitting element L1 to emit light with substantially the same luminance as in the state of reference temperature and also before a temporal change. In other words, the control device 102 in accordance with the present embodiment can restrain decreases in display quality caused by temperature variations. Therefore, the control device 102 in accordance with the present embodiment can restrain decreases in display quality caused by temporal changes and temperature variations as well as can achieve substantially the same effects as in Embodiment 1.

Embodiment 6

Figure 22:
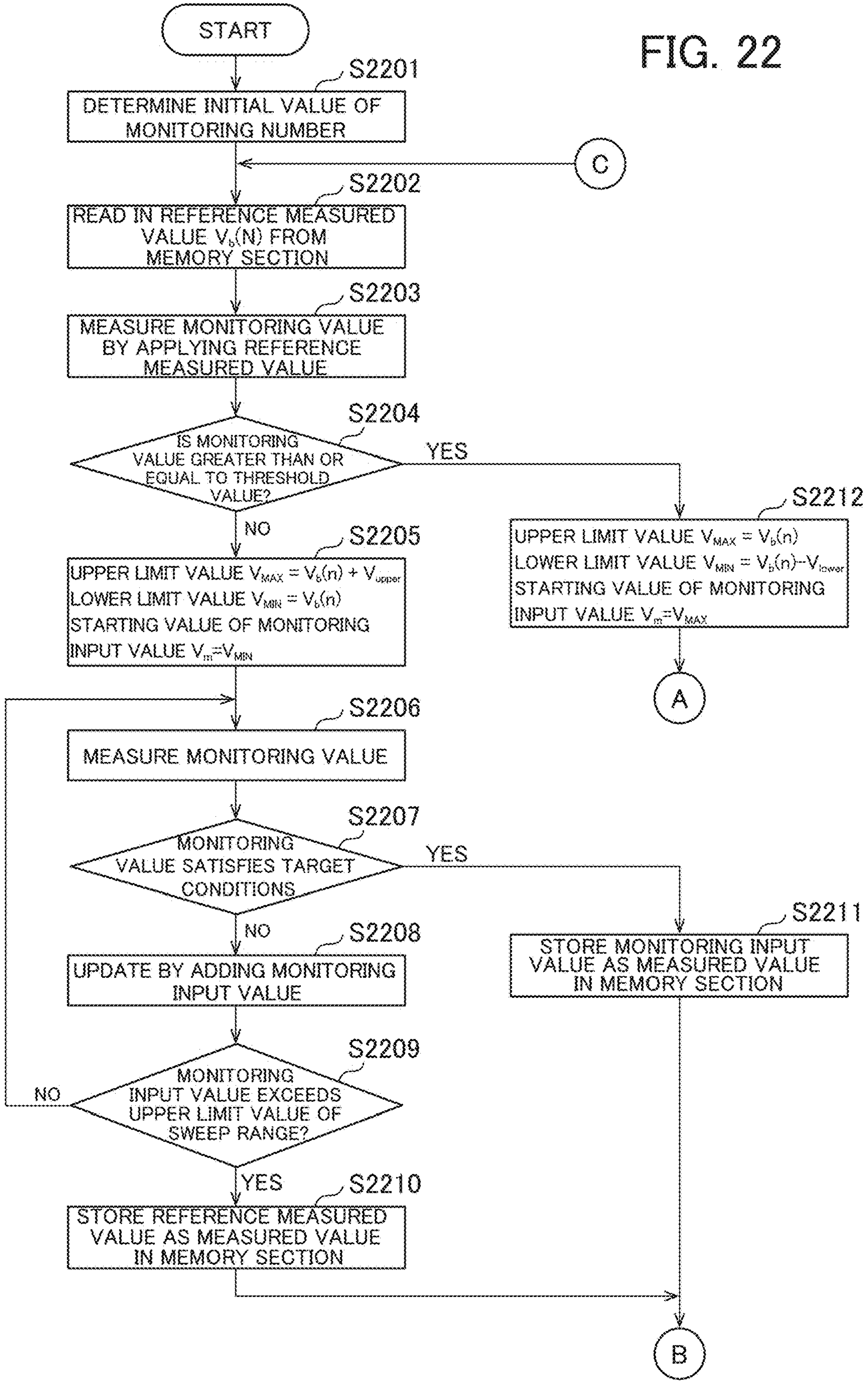
FIG. 22 is a flow chart representing an example of a process of obtaining a measured value in a control device in accordance with Embodiment 6.
Figure 23:
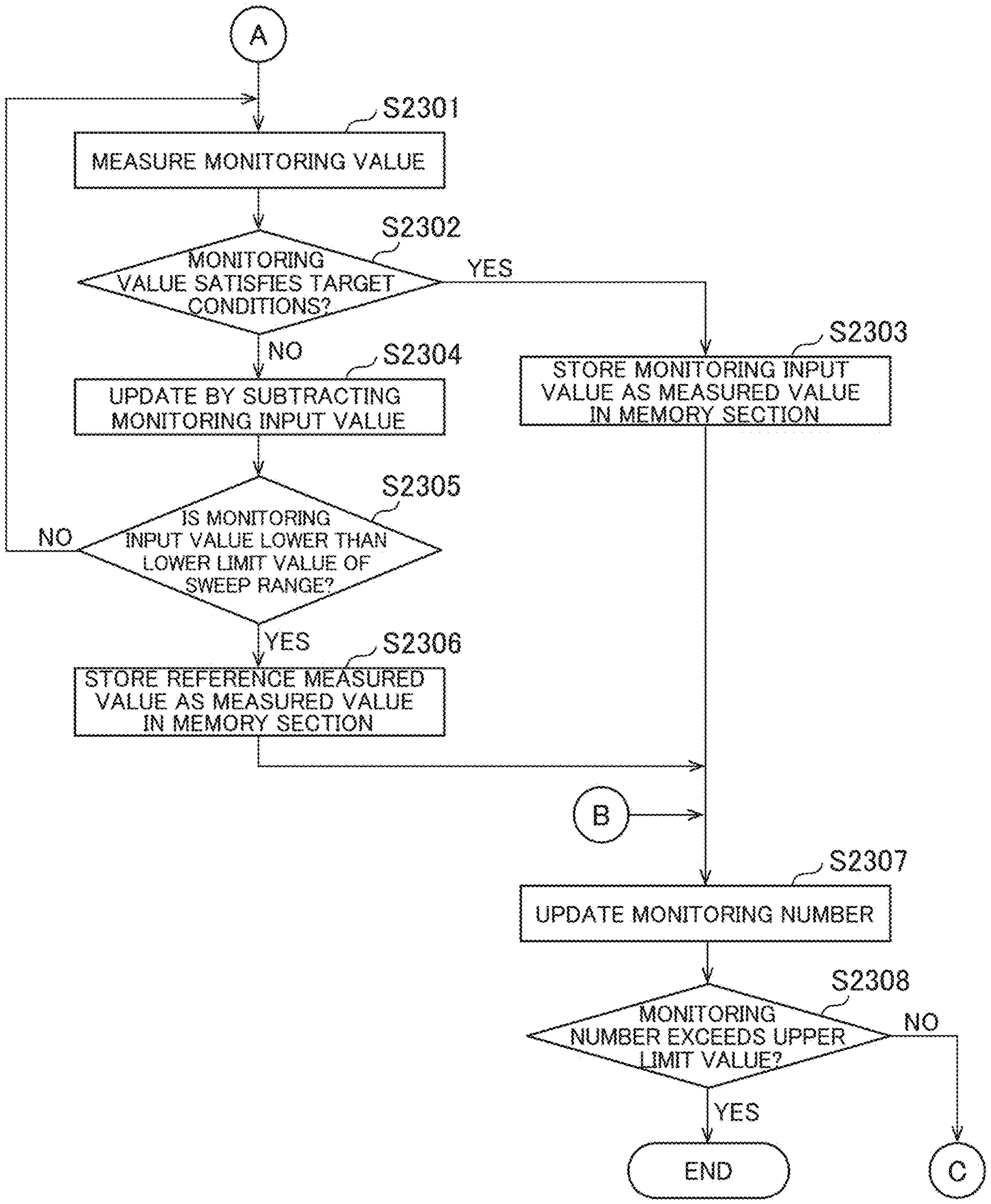
FIG. 23 is a flow chart representing an example of a process of obtaining a measured value, subsequent to the process represented as an example in FIG. 22.

A description is given of Embodiment 6 with reference to FIGS. 22 to 23. Note that identical and equivalent elements are denoted by the same reference numerals, and description thereof is not repeated. The members and processes of the present embodiment that have practically the same arrangement and function as the members and processes of Embodiment 1 are denoted by the same reference numerals, and description thereof is omitted. The description will focus on differences from Embodiment 1.

The monitoring control section 112 in accordance with the present embodiment sweeps the monitoring input value 121 upwards starting from the reference measured value 123*b* when the monitoring value 122 measured by supplying the reference measured value 123*b* to the pixel circuit 103 is less than a threshold value. Furthermore, the monitoring control section 112 in accordance with the present embodiment sweeps the monitoring input value 121 downwards starting from the reference measured value 123*b* when the monitoring value 122 measured by supplying the reference measured value 123*b* to the pixel circuit 103 is greater than or equal to the threshold value.

FIG. 22 is a flow chart representing an example of a process of obtaining the measured value 123*a* in the control device 102 in accordance with the present embodiment. The process of steps S2201 to S2202 shown as an example in FIG. 22 is substantially the same as steps S501 to S502 shown as an example in FIG. 5, and detailed description thereof is omitted.

In step S2203, the current measuring section 302 measures a current value $I_0$ which is the monitoring value 122 by applying the voltage value Vb(n) which is the reference measured value 123*b* read in step S2202 to the pixel circuit 103.

If the current value $I_0$ is not greater than or equal to the threshold value in step S2204 (No), the monitoring control section 112, in step S2205, specifies the upper limit value Vmax of the sweep range to a value that is larger by the second value Vupper than the reference measured value

123*b*. Furthermore, in step S2205, the monitoring control section 112 specifies the lower limit value Vmin of the sweep range to the voltage value Vb(n) which is the reference measured value 123*b*. Furthermore, in step S2205, the monitoring control section 112 specifies the starting value of the monitoring input value to the lower limit value Vmin of the sweep range. Then, in step S2205, the monitoring control section 112 specifies the sweeping direction to an increasing direction from a voltage value Vmin to Vmax. Then, the control device 102 moves the process to step S2206. The process of steps S2206 to S2211 is substantially the same as the process of steps S505 to S510 shown as an example in FIG. 5, and detailed description thereof is omitted. After performing the process of step S2210 or step S2211, the control device 102 moves the process to step S2307 shown as an example in FIG. 23.

On the other hand, if the current value $I_0$ is greater than or equal to the threshold value in step S2204 (Yes), the monitoring control section 112, in step S2212, specifies the upper limit value Vmax of the sweep range to the voltage value Vb(n) which is the reference measured value 123*b*. Furthermore, in step S2212, the monitoring control section 112 specifies the lower limit value Vmin of the sweep range to a value that is smaller by the first value Vlower than the reference measured value 123*b*. Furthermore, in step S2212, the monitoring control section 112 specifies the starting value of the monitoring input value 121 to the upper limit value Vmax of the sweep range. Then, in step S2212, the monitoring control section 112 specifies the sweeping direction to a decreasing direction from a voltage value Vmax to Vmin. Then, the control device 102 moves the process to step S2301 shown as an example in FIG. 23.

A subsequent description is given next of a process of obtaining the measured value 123*a* in the control device 102 in accordance with the present embodiment with reference to FIG. 23.

In step S2301, the monitoring control section 112 measures the current value Im which is the monitoring value 122 by applying the voltage value Vm which is the monitoring input value 121 to the pixel circuit 103 that is a measurement target. The process of step S2301 is substantially the same as the process of step S505 shown as an example in FIG. 5, and detailed description thereof is omitted.

In step S2302, the monitoring control section 112 determines whether or not the current value Im which is the monitoring value 122 satisfies the target conditions. Specifically, the current comparing section 303 determines whether or not the current value Im which is the monitoring value 122 is less than or equal to the current threshold value for the monitoring number n. If the current value Im which is the monitoring value 122 is less than or equal to the current threshold value for the monitoring number n, the current comparing section 303 determines that the current value Im which is the monitoring value 122 satisfies the target conditions. On the other hand, if the current value Im which is the monitoring value 122 is not less than or equal to the current threshold value for the monitoring number n, the current comparing section 303 determines that the current value Im which is the monitoring value 122 does not satisfy the target conditions.

If the current value Im which is the monitoring value 122 satisfies the target conditions in step S2302 (Yes), the monitoring control section 112, in step S2303, causes the memory section 111 to store the monitoring input value 121 as the measured value 123*a*. Then, the control device 102 moves the process to step S2307. On the other hand, if the current value Im which is the monitoring value 122 does not satisfy the target conditions in step S2302 (No), the monitoring control section 112, in step S2304, determines, as the monitoring input value 121 for a next step, a voltage value that is lower by the step width Vint than the voltage value Vm which is the monitoring input value 121 in step 2301.

In step S2305, the monitoring control section 112 determines whether or not the voltage value Vm which is the monitoring input value 121 updated in step S2304 is lower than the lower limit value Vmin of the sweep range determined in step S2212 shown as an example in FIG. 22.

If the voltage value Vm which is the monitoring input value 121 is greater than or equal to the lower limit value Vmin of the sweep range in step S2305 (No), the control device 102 returns the process to step S2301. In other words, the control device 102 repeats the process of steps S2301 to S2305 until the voltage value Vm which is the monitoring input value 121 becomes lower than the lower limit value Vmin of the sweep range.

On the other hand, if the voltage value Vm which is the monitoring input value 121 is lower than the lower limit value Vmin of the sweep range in step S2305 (Yes), the monitoring control section 112, in step S2306, causes the memory section 111 to store the voltage value Vb(n) which is the reference measured value 123*b* as the measured value 123*a*. Then, the control device 102 moves the process to step S2307.

In step S2307, the monitoring control section 112 updates the monitoring number n to n=n+1. In step S2308, the monitoring control section 112 determines whether or not the number N of the correction parameters P which is the upper limit value of the monitoring number n updated in step S2307 is exceed. If the monitoring number n does not exceed the number N of the correction parameters P in step S2308 (No), the control device 102 returns the process to step S2202 shown as an example in FIG. 22. On the other hand, if the monitoring number n updated in step S2307 exceeds the number N of the correction parameters P in step S2308 (Yes), the control device 102 terminates the process of obtaining the characteristics of the pixel circuit 103.

As described above, the control device 102 in accordance with the present embodiment can further reduce the measurement time for, for example, a drive transistor in external compensation for the display device 100, by supplying the reference measured value 123*b* which is a previous measured value 123*a* to the pixel circuit 103 and determining the sweeping direction in accordance with whether or not the measured monitoring value 122 is greater than or equal to a threshold value.

The disclosure is not limited to the description of the embodiments above and may be altered within the scope of the claims. Embodiments based on a proper combination of technical means disclosed in different embodiments are encompassed in the technical scope of the disclosure. Furthermore, new technological features can be created by combining different technical means disclosed in the embodiments.

The invention claimed is:

1. A control device comprising:

a monitoring control circuitry obtaining, from within a sweep range, a measured value related to a characteristic of a pixel circuit, the pixel circuit including:

a light-emitting element, and a drive transistor controlling an electric current flowing in the light-emitting element;

a correction parameter determining circuitry determining a correction parameter based on the measured value; and a signal correction processing circuitry calculating a drive voltage value for the pixel circuit by correcting a gray level value based on the correction parameter, wherein:

the monitoring control circuitry determines the sweep range based on a reference measured value that is a previously obtained measured value, the monitoring control circuitry further obtains a plurality of measured values, including the measured value, related, respectively, to characteristics of a first plurality of pixel circuits that is adjacent to the pixel circuit, and a starting value of the sweep range is a smallest value of a plurality of previously obtained measured values, including the previously obtained measured value.

2. The control device according to claim 1, wherein when a monitoring value, measured by supplying a monitoring input value in the sweep range to the pixel circuit, satisfies a target condition, the monitoring control circuitry obtains the monitoring input value as the measured value.

3. The control device according to claim 2, wherein the monitoring input value is swept upwards starting from the starting value of the sweep range.

4. The control device according to claim 3, wherein when another monitoring value, measured by supplying the starting value to the pixel circuit, satisfies the target condition, the monitoring control circuitry obtains the measured value by sweeping the monitoring input value upwards starting from a new starting value that is lower than the starting value.

5. The control device according to claim 3, wherein the sweep range has an ending value that is greater than the reference measured value by a second value.

6. The control device according to claim 2, wherein the monitoring control circuitry sweeps the monitoring input value upwards starting from the reference measured value when another monitoring value, measured by supplying the reference measured value to the pixel circuit, is less than a threshold value and the monitoring control circuitry sweeps the monitoring input value downwards starting from the reference measured value when the other monitoring value, measured by supplying the reference measured value to the pixel circuit, is greater than, or equal to, the threshold value.

7. The control device according to claim 2, wherein the monitoring control circuitry corrects, based on a temperature value output from a temperature sensor that measures a temperature of the pixel circuit, the monitoring value measured by supplying the monitoring input value to the pixel circuit and when a corrected monitoring value satisfies the target condition, the monitoring control circuitry obtains the monitoring input value as the measured value.

8. The control device according to claim 2, wherein:

the monitoring input value is a voltage value, and the monitoring value is a current value measured when the voltage value is applied to the pixel circuit.

9. The control device according to claim 2, wherein:

the monitoring input value is a current value, and the monitoring value is a voltage value measured when the current value flows in the pixel circuit.

10. The control device according to claim 1, wherein when the measured value is not obtained from within the sweep range, the monitoring control circuitry obtains the reference measured value as the measured value.

11. The control device according to claim 1, wherein when the measured value is not obtained from within the sweep range, the monitoring control circuitry expands an ending value side of the sweep range.

12. The control device according to claim 1, wherein the measured value represents a characteristic of at least one of the light-emitting element or the drive transistor.

13. The control device according to claim 1, further comprising: a memory storing the measured value and the correction parameter, wherein:

when a new measured value is obtained using the measured value as the reference measured value, the monitoring control circuitry causes the memory to store the new measured value in place of the measured value, and when a new correction parameter is determined, the correction parameter determining circuitry causes the memory to store the new correction parameter in place of the correction parameter.

14. The control device according to claim 1, further comprising:

a memory storing the correction parameter; and a reference measured value calculation circuitry calculating the reference measured value based on the correction parameter, wherein when a new correction parameter is determined, the correction parameter determining circuitry causes the memory to store the new correction parameter in place of the correction parameter.

15. The control device according to claim 1, further comprising: a memory storing the measured value, wherein:

when a new measured value is obtained using the measured value as the reference measured value, the monitoring control circuitry causes the memory to store the new measured value in place of the measured value, and the correction parameter determining circuitry determines the correction parameter based on the new measured value.

16. A display device comprising:

a second plurality of pixel circuits including the pixel circuit according to claim 1; and the control device, wherein the control device controls the second plurality of pixel circuits.

* * * * *